United States Patent
Hidayat et al.

(10) Patent No.: US 11,566,909 B2
(45) Date of Patent: Jan. 31, 2023

(54) SYSTEMS AND METHODS FOR OPTIMAL PATH DETERMINATION USING CONTRACTION HIERARCHIES WITH TURN COSTS

(71) Applicant: Verizon Patent and Licensing Inc., Basking Ridge, NJ (US)

(72) Inventors: Jefferson Ray Tan Hidayat, Christchurch (NZ); Nathan M. Robinson, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 163 days.

(21) Appl. No.: 17/068,598

(22) Filed: Oct. 12, 2020

(65) Prior Publication Data

US 2022/0113150 A1 Apr. 14, 2022

(51) Int. Cl.
*G01C 21/34* (2006.01)
(52) U.S. Cl.
CPC ..... *G01C 21/3446* (2013.01); *G01C 21/3453* (2013.01)
(58) Field of Classification Search
CPC .......................... G01C 21/3446; G01C 21/3453
See application file for complete search history.

(56) References Cited

U.S. PATENT DOCUMENTS

| | | | | |
|---|---|---|---|---|
| 8,670,937 | B2* | 3/2014 | Shinagawa | G01C 21/34 701/428 |
| 9,612,128 | B2* | 4/2017 | Delling | G01S 19/42 |
| 2013/0294702 | A1* | 11/2013 | Baselau | G01C 21/26 382/199 |
| 2017/0325068 | A1* | 11/2017 | Bertelli | H04W 4/025 |
| 2020/0025583 | A1* | 1/2020 | Herlocker | G08G 1/0133 |
| 2020/0318981 | A1* | 10/2020 | Tyuryutikov | G01C 21/20 |

* cited by examiner

*Primary Examiner* — Ryan Rink

(57) ABSTRACT

A system described herein may provide a technique for selectively adding or forgoing adding shortcut links to a node map using contraction hierarchy techniques based on turn costs. "Useful" turn pairs for a given path through a shortcut link may include a turn into a first node of the shortcut link and a turn out of a second node of the shortcut link, where no alternative lower cost paths (including such "useful" turn pairs) from the first node to the second node are available. The useful turn pairs for a shortcut link may be used to evaluate super shortcut links that includes the shortcut link with identified useful turn pairs. For example, a search for alternative lower cost paths may need not be performed for paths, associated with the super shortcut link, which do not include a turn from the useful turn pairs of the component shortcut link.

20 Claims, 16 Drawing Sheets

| Turn costs for Path(BE) | | |
|---|---|---|
| Turn | Cost | Turn type |
| $TI_1$ | 2.5 | Right turn |
| $TI_2$ | 0.0 | Straight |
| $TI_3$ | 7.0 | Left turn |
| $TI_4$ | 99.0 | U-Turn |
| $TO_1$ | 3.2 | Right turn |
| $TO_2$ | 97.8 | U-Turn |
| $TO_3$ | 5.3 | Left turn |

Witness Searches for Candidate Shortcut Path(CE) — 1200

| Turn In | Turn Out | Witness search | Witness Found |
|---|---|---|---|
| $TI_5$ | $TO_1$ | Yes | No |
| $TI_6$ | $TO_1$ | Yes | No |
| $TI_7$ | $TO_1$ | Yes | Yes |
| $TI_5$ | $TO_2$ | No | - |
| $TI_6$ | $TO_2$ | No | - |
| $TI_7$ | $TO_2$ | No | - |
| $TI_5$ | $TO_3$ | No | - |
| $TI_6$ | $TO_3$ | No | - |
| $TI_7$ | $TO_3$ | No | - |

Include Shortcut Link(CE) in node map with useful Turn Pairs $(TI_5, TO_1)$ and $(TI_6, TO_1)$

FIG. 12

Witness Searches for Candidate Shortcut Path(BD) — 1400

| Turn In | Turn Out | Witness search | Witness found |
|---|---|---|---|
| $TI_1$ | $TO_4$ | No | - |
| $TI_1$ | $TO_5$ | No | - |
| $TI_1$ | $TO_6$ | No | - |
| $TI_1$ | $TO_7$ | No | - |
| $TI_2$ | $TO_4$ | No | - |
| $TI_2$ | $TO_5$ | No | - |
| $TI_2$ | $TO_6$ | No | - |
| $TI_2$ | $TO_7$ | No | - |
| $TI_3$ | $TO_4$ | Yes | Yes |
| $TI_3$ | $TO_5$ | Yes | Yes |
| $TI_3$ | $TO_6$ | Yes | Yes |
| $TI_3$ | $TO_7$ | Yes | Yes |
| $TI_4$ | $TO_4$ | No | - |
| $TI_4$ | $TO_5$ | No | - |
| $TI_4$ | $TO_6$ | No | - |
| $TI_4$ | $TO_7$ | No | - |

Omit Shortcut Path(BD) from node map based on no useful turn pairs

FIG. 14

SYSTEMS AND METHODS FOR OPTIMAL PATH DETERMINATION USING CONTRACTION HIERARCHIES WITH TURN COSTS

BACKGROUND

Navigation systems may have the ability to generate turn-by-turn navigation directions from arbitrary starting points to arbitrary destinations. Some systems may precompute directions for commonly traveled routes using contraction hierarchies or other similar techniques, in which a set of turns, paths, or the like are contracted into a single "shortcut" that represents the turns, paths, etc. Such precomputed shortcuts may be used when generating particular navigation instructions at "query" time from a particular starting point to a particular destination, thus saving time and processing resources that would be expended after the query is received.

BRIEF DESCRIPTION OF THE DRAWINGS

FIG. 12 illustrates an example determination that the particular candidate super shortcut path of FIG. 11 is a valid shortcut path in accordance with some embodiments;

FIG. 14 illustrates an example determination that the particular candidate super shortcut path of FIG. 13 is not a valid shortcut path in accordance with some embodiments;

DETAILED DESCRIPTION OF EXAMPLE EMBODIMENTS

Figure 1:
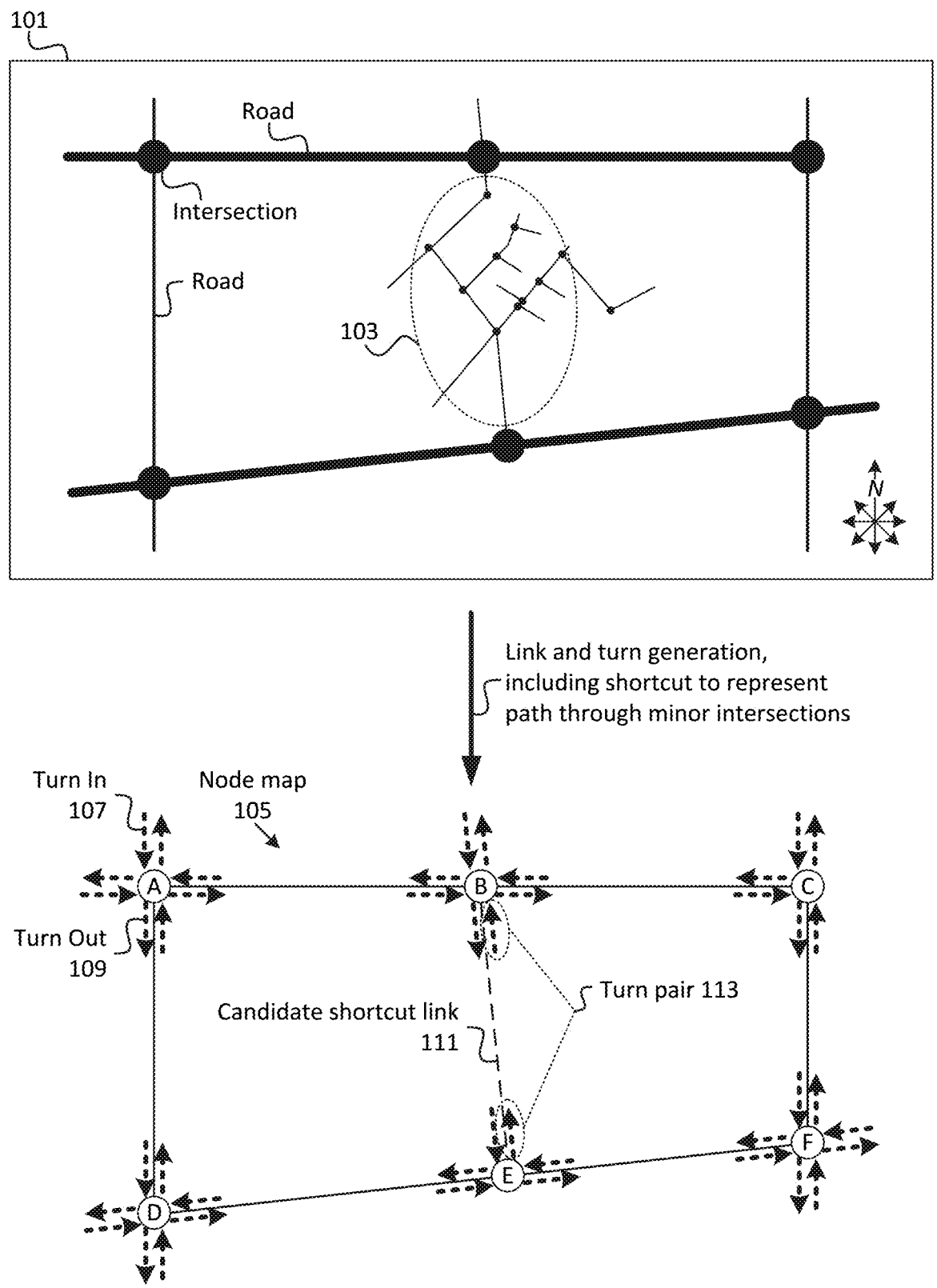
FIG. 1 illustrates an example generation of nodes, links, and turn pairs, including a candidate shortcut link that represents one or more paths through multiple nodes.

The following detailed description refers to the accompanying drawings. The same reference numbers in different drawings may identify the same or similar elements.

Embodiments described herein provide for the identification of constraints on particular links or nodes in a node map, and the selective generation of shortcut links based on such constraints. For example, the node map may include links between respective nodes. The node map may include precomputed "shortcut" links between some nodes, where a shortcut link represents multiple links between multiple nodes. The shortcut link may be added to the node map (e.g., may replace the component nodes and links in the node map, and/or may be added in addition to the component nodes and links), such that when the node map is used for a solution to a query (e.g., a shortest path solution, a lowest cost solution, a set of navigation instructions in response to a navigation request, or the like), the shortcut link may be used in lieu of computing a path through the component nodes and links of the shortcut link.

While adding shortcut links to a node map may reduce processing time and/or resources when the node map is evaluated for a query, the size of the node map (e.g., size of computer files associated with the node map, size of one or more data structures associated with the node map, or the like) may increase to an unmanageable size if too many shortcuts are added. The larger size of the node map may consume a relatively large amount of storage resources, and/or may end up slowing down processing at query time due to the potentially larger data set to be evaluated at query time. Further, the processing time and/or resources to generate a node map may be relatively intensive, and adding excessive or unnecessary shortcut links to the node map may make the node map generation process (e.g., using conditional hierarchies) burdensome or unfeasible depending on hardware constraints. Thus, while it may be useful to include shortcut links in the node map when such shortcut links may be used for queries, limiting the quantity of shortcut links based on some criteria may provide better performance than adding more than a predetermined or dynamic number of shortcut links.

Further, the cost of a given path through a set of nodes may vary based on the types of turns taken to enter or exit the path. For example, a straight line through a node may have a relatively small or zero cost, a right or left turn through a node may have a relatively moderate cost, and a U-turn through a node have a relatively high or infinite cost. Embodiments herein may take such "turn cost" into account when determining whether to add a shortcut link to a node map. For example, embodiments may evaluate "turn in" costs (e.g., costs associated with a turn into a candidate shortcut path) and "turn out" costs (e.g., costs associated with a turn out from a candidate shortcut path) for one or more paths through a candidate shortcut link to determine whether to include the candidate shortcut link in the node map. Further, embodiments described herein may identify particular turn pairs for which a candidate shortcut link is "useful."

As referred to herein, a "link" may refer to connection between two nodes. A link may have the two nodes as endpoints, but the references herein of links do not necessarily refer to either endpoint as a starting node or an ending node. That is, a link as discussed herein may be a non-directional or direction-agnostic connection between two endpoint nodes. As referred to herein, a "path" may refer to a directed path from a starting node to an ending node. A path may therefore traverse "through" one or more links or nodes. The endpoints of a path may include a starting node and an ending node, and the path may include one or more intermediate nodes as well.

As shown in FIG. 1, for example, map 101 may represent a set of roads and intersections between the roads. In this figure, the intersections are denoted by filled circles on map 101. Map 101 may also include a set of "minor" roads 103. For example, each road and/or intersection may be associated with a score or other measure of "importance," which may be based on factors such as road size, road length, amount of traffic traveling on the road, and/or other attributes.

Some embodiments may generate node map 105 based on map 101 (e.g., based on the roads and/or intersections depicted in map 101), which may include the generation of one or more links representing roads and nodes representing intersections. Further, node map 105 may include indications of turns associated with particular nodes. The set of turns for a given node may include a set of "turns in" and a set of "turns out." A "turn in" to a node may represent a segment of a path into the node, and a "turn out" from the node may represent a segment of a path out from the node.

For example, Node A is shown in FIG. 1 as being associated with a set of turns in to Node A (denoted by the four dashed arrows adjacent to and pointing at Node A). One example turn in to Node A is turn in 107, one of four example turns in to Node A shown in FIG. 1. Further, Node A is shown in FIG. 1 as being associated with a set of turns out from Node A (denoted by the four dashed arrows adjacent to and pointing away from Node A). One example turn out from Node A is turn out 109, one of four example turns out from Node A shown in FIG. 1.

The turns associated with Node A (i.e., the turns in and the turns out) may indicate ways that a path may enter and/or exit Node A. For example, turn in 107 may be associated with a segment of the path from the road that is directly to the north of the intersection, depicted in map 101, that is represented by Node A. Further, turn out 109 may be associated with a segment of the path from the road that is directly to the south of the intersection, depicted in map 101, that is represented by Node A.

Further, node map 105 may include one or more shortcut links. In the example here, candidate shortcut link 111 may represent the set of minor roads 103 depicted in map 101. Candidate shortcut link 111 may be determined using contraction hierarchy techniques (e.g., in which minor roads 103 are determined to be candidates for contraction into a shortcut link). For example, candidate shortcut link 111 may be determined based on measures of importance of minor roads 103. Candidate shortcut link 111 may be a "candidate" shortcut link in that embodiments described herein may determine whether candidate shortcut link 111 should ultimately be included in node map 105 or omitted. For example, as discussed below, some embodiments may evaluate turn costs associated with candidate shortcut link 111 and one or more other links or paths between links to determine whether potential situations may exist where candidate shortcut link 111 is included in an appropriate path for a potential query, and/or where candidate shortcut link 111 is not included in an appropriate path for other potential queries.

For example, as discussed below, embodiments may evaluate turn pairs associated with candidate shortcut link 111 to evaluate whether candidate shortcut link 111 is a shortcut link to ultimately include in node map 105. Further, embodiments may identify particular turn pairs for which candidate shortcut link 111 is a valid shortcut link (e.g., for which no other lower cost paths exist), and/or for which candidate shortcut link 111 is not a valid shortcut link (e.g., for which one or more other lower cost paths exist). As discussed below, a lower cost alternative to a candidate shortcut link may be referred to as a "witness path," where the starting and ending nodes of the witness path are the same nodes as the endpoints of the candidate shortcut link.

A "turn pair," as used herein, may refer to a particular turn in to a candidate shortcut link and a particular turn out from the candidate shortcut link. For example, turn pair 113 is one possible turn pair for candidate shortcut link 111, as turn pair 113 includes one possible turn in to Node B out of four possible turns in to Node B (as shown in FIG. 1), and further includes one possible turn out from Node E out of three possible turns out from Node E, as also shown in FIG. 1.

In some embodiments, turns associated with candidate shortcut links may be evaluated in both directions. That is, the link between Node B and Node E (referred to herein using the notation "Link(BE)") may include Path(BE) and Path(EB), both of which may be associated with their own respective sets of turn pairs. For example, as shown in the drawings, a dotted arrow pointing to a node may indicate a turn into the node, and a dotted arrow pointing out of the node may indicate a turn out from the node. Thus, Path(BE) may be associated with 12 turn pairs (e.g., including the 4 turns into Node B and the 3 turns out of Node E), and Path(EB) be associated with 12 different turn pairs (e.g., including the 3 turns into Node E and the 4 turns out of Node B).

Thus, in the example of FIG. 1, candidate shortcut link 111 may be associated with 24 possible turn pairs. For example, Path(BE) may be associated with 12 possible turn pairs, which may result from multiplying the four possible turns in to B by the three possible turns out from E. Further, Path(EB) may be associated with another 12 possible turn pairs, which may result from multiplying the three possible turns in to E by the four possible turns out from B.

As described below, some embodiments may evaluate the 24 turn pairs associated with candidate shortcut link 111 to determine whether candidate shortcut link 111 should be included in node map 105 as a shortcut link. Further, some embodiments may determine which particular turn pairs result in a "useful" traversal of candidate shortcut link 111, and/or which turn pairs do not result in a "useful" traversal of candidate shortcut link 111. As used herein, a "useful" traversal of candidate shortcut link 111 includes path through candidate shortcut link 111, including a particular turn pair, where the path is lower in cost than some or all other paths. In other words, a useful traversal of candidate shortcut link 111, with a particular turn pair, is a traversal of the candidate shortcut link for which no witness path exists with that same turn pair. Thus, candidate shortcut link 111 may be "useful" for some turn pairs, while candidate shortcut link 111 may not be "useful" for other turn pairs. Generally speaking, for example, a particular candidate shortcut link 111 may not be useful when the turn pairs include U-turns, and/or where the turns in and/or turns out for candidate shortcut link 111 result in a higher cost for a path through candidate shortcut link 111 than for alternate paths (e.g., witness paths) that do not include candidate shortcut link 111.

Some embodiments may further track which turn pairs are useful for a given shortcut link, and may use such "useful" turn pairs in an iterative and/or recursive process in which a candidate shortcut link includes a path through one or more previously analyzed shortcut links. A shortcut link that includes one or more other shortcut links may be referred to herein as a "super shortcut link" with respect to the one or more other shortcut links. Further, a shortcut link that is included in a super shortcut link may be referred to as a "component shortcut link." Thus, a super shortcut link may include a component shortcut link and one or more other links (e.g., one or more other component shortcut links and/or one or more other component non-shortcut links).

As discussed below, the determination of whether to include a super shortcut link in the node map may include evaluating useful turn pairs for the component shortcut link(s) of the super shortcut link. Further, turn pairs that were previously determined as being not useful for the component link shortcut link(s) may not be evaluated, thus saving processing time and/or resources in evaluating the super shortcut link. For example, if a turn pair was not useful or was otherwise invalid for a component shortcut link, it may be assumed that the turn pair would not be useful for a super shortcut link that includes the component shortcut link.

In some embodiments, turn pairs 113 associated with candidate shortcut link 111 may be evaluated by evaluating the turn pairs for paths in both directions through candidate shortcut link 111, which may include Path(EB) and Path (BE). For the sake of brevity, examples are provided below in the context of evaluating candidate shortcut link 111 on the basis of one direction (e.g., Path(BE)). In practice, similar concepts may apply to evaluating candidate shortcut link 111 on the basis of the other direction (e.g., Path(EB)) in addition to or in lieu of the example direction.

Figures 2, 3:
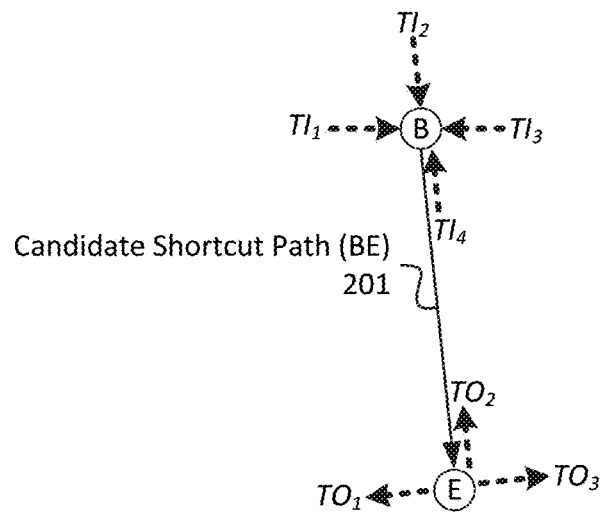
FIG. 2 illustrates an example of possible turns that may be made into and out of a candidate shortcut path associated with a candidate shortcut link.
FIG. 3 illustrates example turn costs for the possible turns that may be made into and out of a candidate shortcut path (e.g., a path through a candidate shortcut link)

FIG. 2 illustrates particular example pairs associated with candidate shortcut path 201—that is, Path(BE). A "shortcut path," as referred to herein, may be a path that includes only a shortcut link. Thus, candidate shortcut path 201 includes only candidate shortcut link 111, and further refers to only one direction through candidate shortcut link 111. That is, candidate shortcut path 201 includes Node B as a starting point and Node E as an ending point. As similarly noted above, candidate shortcut path 201 may include four turns in, denoted as $TI_1$ through $TI_4$. Candidate shortcut path 201 may also include three turns out, denoted as $TO_1$ through $TO_3$.

As shown in FIG. 2, $TI_1$ may be a right turn, in which Node B is approached from the left side of FIG. 2 and a right turn is needed to follow candidate shortcut path 201 to Node E when Node B is approached from the left. Further, $TI_2$ may be a straight path, as no turn is required to reach Node E when approaching Node B from the top side of FIG. 2. As further shown, $TI_3$ may be a left turn, and $TI_4$ may be a U-turn. That is, if Node B is approached from the bottom side of FIG. 2, a U-turn would be required to reach Node E from Node B. Similarly, $TO_1$ may be a right turn out of Node E, $TO_2$ may be a U-turn out of Node E, and $TO_3$ may be a left turn out of Node E.

Each turn in to candidate shortcut path 201 and turn out from candidate shortcut path 201 may be associated with a "cost." As referred to herein, "cost" may refer to resources, time, or other suitable metrics. For example, a U-turn may be more costly than a right or left turn, as a U-turn may be expected to take more time than a right or left turn. As another example, a left or right turn may be more costly than a straight path. As yet another example, a turn in one direction may be less costly than a turn in another direction. For example, in situations where a given candidate link is associated with a roadway that features traffic that flows on the right side of the roadway, a right turn may be less costly than a left turn. As another example, some intersections may have attributes or factors that affect the cost, such as the presence of stop signs, traffic lights, crosswalks, high or low traffic density, and/or other attributes or factors.

FIG. 3 illustrates example turn costs 300 associated with candidate shortcut path 201. For example, $TI_1$, a right turn, may have a higher turn cost than $TI_2$, a straight path. Further, $TI_1$ may have a lower turn cost than $TI_3$ and $TI_4$. As noted above, for example, various factors may affect the turn cost for a given turn, such as whether the turn includes a U-turn, left turn, right turn, or straight path. As further noted above, other factors may further affect the cost, which may result in different costs for the same type of turn. For example, although $TI_1$ and $TO_1$ are both right turns, these turns may have differing attributes that cause the turn costs to differ (e.g., 2.5 and 3.2, respectively). While example values ranging from 0.0 to 99.0 are shown in FIG. 3, in practice, other values or ranges may be used.

Figure 4:
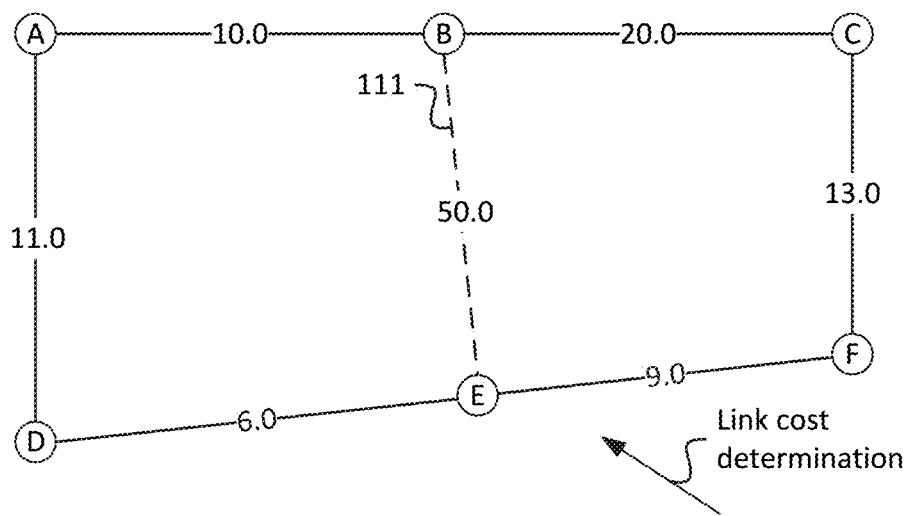
FIG. 4 illustrates example "costs" associated with the example links.

As referred to above, each link may be associated with a "cost," which may represent time spent traversing the link, resources spent traversing the link (e.g., fuel in situations where the link represents a physical road, electricity in situations where the link represents a pipeline through which fluid is pumped, etc.), or other suitable metrics that may be reflected by a cost, score, or the like. For example, as shown in FIG. 4, the cost of the link between Node A and Node B—that is, Link(AB)—is 10.0, the cost of Link(BC) is 20.0, the cost of candidate shortcut link 107 (e.g., Link(BE)) is 50.0, and so on. As discussed below, the link costs as shown in FIG. 4 may be separate from turn costs, and a path cost may be based on one or more turn costs (e.g., a turn in cost and a turn out cost) and one or more component link costs.

Figure 5:
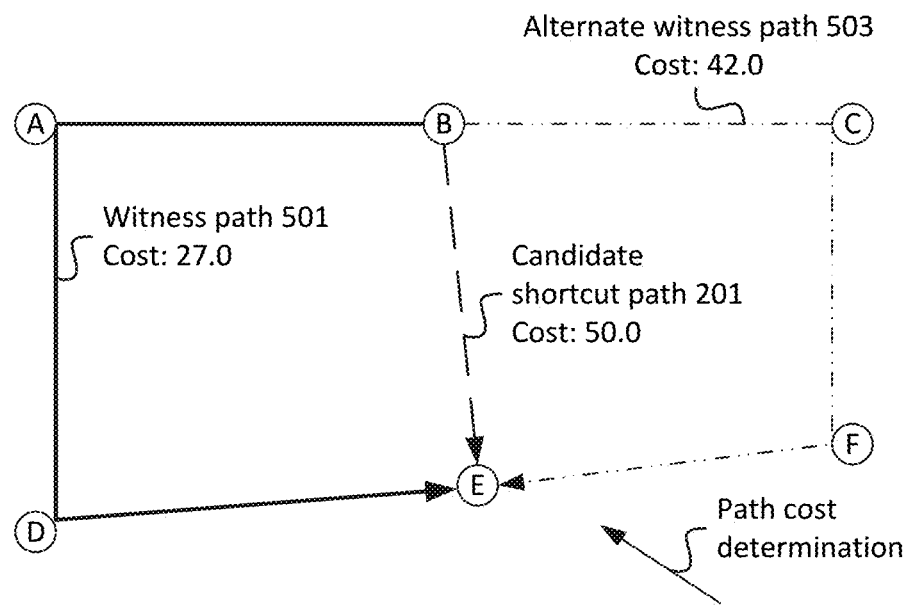
FIG. 5 illustrates an example identification of "witness" paths that serve as lower cost alternatives to a path through the shortcut link.

As shown in FIG. 5, contraction hierarchy techniques may include the determination of whether one or more "witness paths" exist for a given candidate shortcut link, such as candidate shortcut link 111. For example, several paths from Node B to Node E are determined. Candidate shortcut path 201 is one such path. Further, one or more witness paths may be identified. As discussed above, a witness path may refer to a path that has the same starting node and ending node as a shortcut path (or candidate shortcut path), and that also has a lower cost than the shortcut path. In some embodiments, a witness path may not include a shortcut link. In the example of FIG. 5, candidate shortcut path 201 includes only Link(BE)—that is, a path directly from Node B to Node E. In practice, similar concepts may apply when evaluating a path in the other direction along Link(BE), which may be a path directly from Node E to Node B.

In this example, witness path 501—that is, Path (BADE)—may have a cost of 27.0. That is, Path(BADE) may have component links Link(BA), Link(AD), and Link (DE). Referring to the example costs shown in FIG. 4, the respective link costs of these links are 10.0, 11.0, and 6.0, resulting in path cost of 27.0 for witness path 501 (10.0+ 11.0+6.0).

In the examples herein, path costs are computed by adding link costs of component links. In practice, other techniques for computing paths costs may be used. Further, in this example, it is assumed that link costs apply in both directions. In practice, links may have different costs for different directions, and similar concepts may be applied when evaluating such links in different directions. For example, in some scenarios, Link(AB) may have a cost of 10.0 in one direction, and a cost of 15.0 in the other direction. In other words, Path(AB) may have an example cost of 10.0, while Path (BA) may have an example cost of 15.0. In such scenarios, a path cost may be computed by adding path costs of component paths. For example, the cost of Path(BADE) may be based in part on the path cost of Path(BA), but not based on the path cost of Path(AB).

Continuing with the example of FIG. 5, alternate witness path 503, which traverses Path(BCDFE), may have a path cost of 42.0, and candidate shortcut path 201 may have a path cost of 50.0 (e.g., the same cost as Link(BE), or of Path(BE) in situations where Path(BE) and Path(EB) have different costs). Thus, as witness path 501 and alternate witness path 503 each have a lower path cost than candidate shortcut path 201, witness path 501 and alternate witness path 503 may be considered as valid witness paths for shortcut path 201. That is, as similarly noted above, witness path 501 and alternate witness path 503 may each share the same start and end points with shortcut path 201, and may each be associated with a lower cost than shortcut path 201. Alternate witness path 503 may be an "alternate" witness path, in that the cost of alternate witness path 503 is lower than witness path 501. In some embodiments, only one witness path may be determined. For example, processing may continue to evaluating other candidate shortcut links once a witness path is found for shortcut path 201. In some embodiments, multiple witness paths may be attempted to be found for a given shortcut link.

Generally, a determination of at least one witness path for a shortcut link (e.g., for one or more shortcut paths that include the shortcut link, which may include different directions of traversing the same link) may indicate that the shortcut link should be omitted from the node map. For example, the determination of the witness path may indicate that the shortcut link is unlikely to ever be used for a query, as the witness path is by definition a lower cost than the shortcut link. However, as noted above, situations may arise in which turn costs associated with a shortcut path and/or one or more witness paths for the shortcut path may make the shortcut path less costly in some scenarios, while such shortcut path may be more costly in other scenarios. For example, as described herein, such scenarios may arise based on different turn pairs associated with the shortcut path. The above-described example of determining witness paths 501 and 503 does not include accounting for different turn costs, which may be incurred based on different manners of entering or exiting candidate shortcut path 201.

Figure 6:
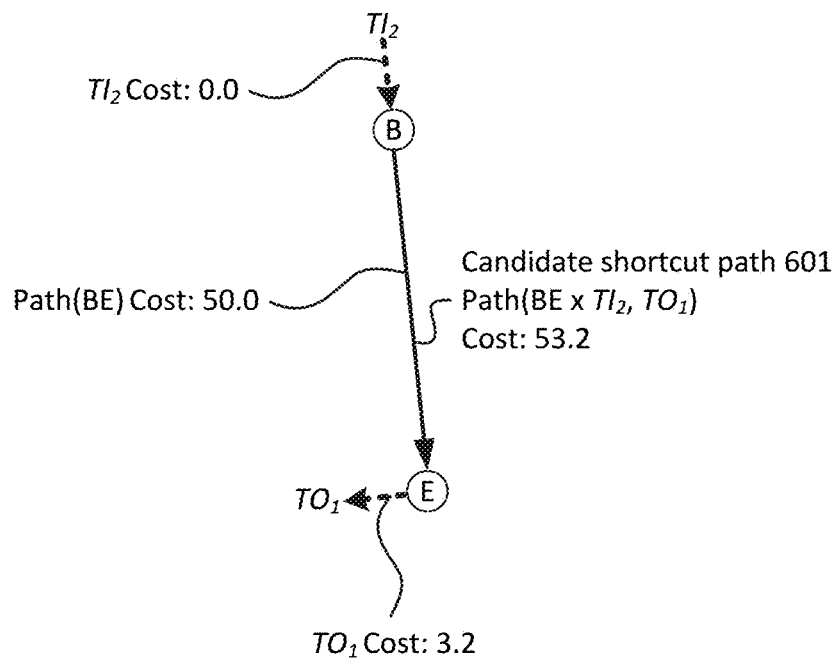
FIG. 6 illustrates an example turn pair associated with a candidate shortcut path.

FIG. 6 illustrates one such example turn pair associated with candidate shortcut path 201. For example, FIG. 6 shows an example of Path(BE), with a turn pair that includes $TI_2$ and $TO_1$. This turn pair includes two particular turns, for example, depicted in FIG. 2 for candidate shortcut path 201. As referred to herein, the notation "Path(BE×$TI_2$, $TO_1$)" refers to Path(BE) with $TI_2$ as a turn in to the path (e.g., into Node B), and with $TO_2$ as a turn out from the path (e.g., from Node E). Referring to the turn costs depicted in FIG. 3 and the link and/or path cost shown in FIGS. 4 and 5 for Path(BE), the path cost for Path(BE×$TI_2$, $TO_2$) may be 53.2. That is, the path cost for Path(BE×$TI_2$, $TO_2$) may be based on the 0.0 turn cost of $TI_2$, the 3.2 turn cost of $TO_1$, and the 50.0 link cost of Link(BE) and/or the path cost of Path(BE), if such path cost is different from the link cost of Link(BE). For example, in this example, the path cost of Path(BE) is computed by summing the costs of the component path(s) and turn(s) associated with Path(BE). In practice, the path cost may be computed using one or more different operations or techniques.

Figure 7:
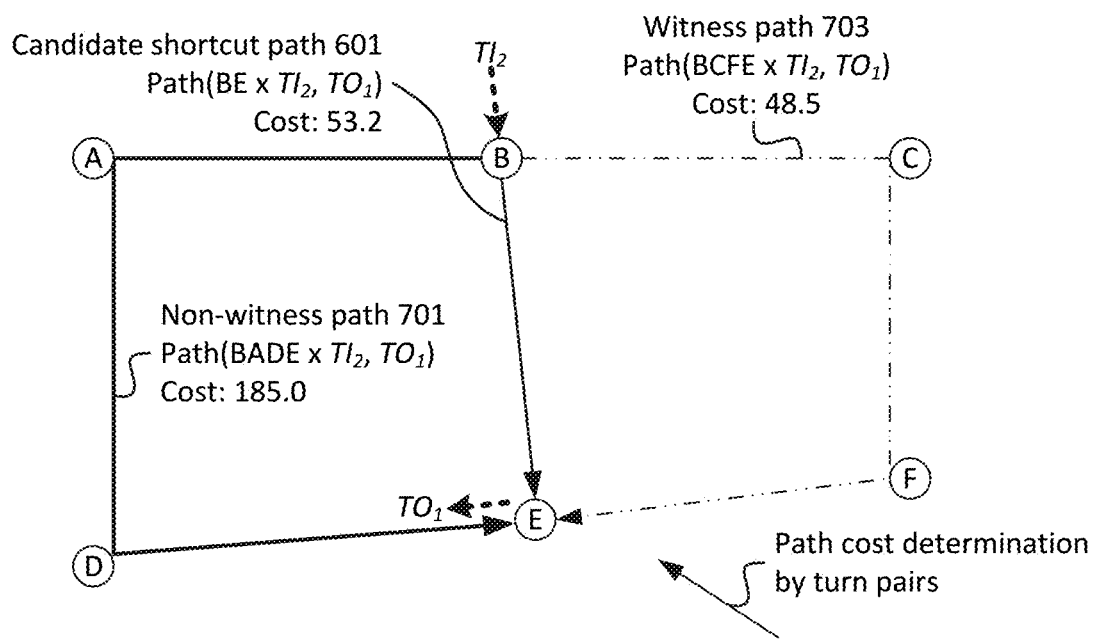
FIGS. 7 and 8 illustrate example witness searches that may be performed, based on turn costs, in order to identify witness paths for candidate shortcut paths.

FIG. 7 illustrates an example witness search performed for candidate shortcut path 601 (e.g., Path(BE×$TI_2$, $TO_1$)). That is, the witness search may be performed for Path(BE) when Node B is approached via $TI_2$ and Node E is exited via $TO_1$. The witness search may be performed in a similar manner as shown in FIG. 5, and further taking into account turn costs in addition to link costs. For example, as shown in FIG. 7, non-witness path 701 (e.g., Path(BADE×$TI_2$, $TO_1$)) may have a cost of 185.0. As similarly described above, the path cost of 185.0 for Path(BADE×$TI_2$, $TO_1$) may be based on path costs associated with component paths of Path(BADE×$TI_2$, $TO_1$), such as the path cost of 10.0 for component Path(BA), the path cost of 11.0 for component Path(AB), and the path cost of 6.0 for component Path(DE). Further, the path cost of 185.0 for Path(BADE×$TI_2$, $TO_1$) may be based on turn costs associated with component turns of Path(BADE×$TI_2$, $TO_1$), such as a turn cost of the right turn from Node B to Node A after entering Node B via $TI_2$, a turn cost of the left turn through Node A when entering Node A from Node B, a turn cost of the left turn through Node D when entering Node D from Node A, and the U-turn when entering Node E from Node D and exiting Node E toward $TO_1$. Thus, based on the path costs and turn costs of the component paths and turns of Path(BADE×$TI_2$, $TO_1$), it may be determined that Path(BADE×$TI_2$, $TO_1$) is not a witness path, as the path cost of Path(BADE×$TI_2$, $TO_1$) is greater than the path cost of candidate shortcut Path(BE× $TI_2$, $TO_1$).

As further shown, the witness search may include evaluating Path(BCFE), with the same turn pair as candidate shortcut path 601, to determine whether Path(BCFE) is a valid witness path for candidate shortcut path 601. Specifically, the witness search may include computing the path cost for Path(BCFE×$TI_2$, $TO_1$) and comparing the path cost of Path(BCFE×$TI_2$, $TO_1$) to the path cost of Path(BE×$TI_2$, $TO_1$). For example, based on the path costs and turn costs of the component paths and turns, respectively, of Path(BCFE× $TI_2$, $TO_1$), the path cost for Path(BCFE×$TI_2$, $TO_1$) may be 48.5. As 48.5 is a lower path cost than the 53.2 path cost of Path(BE×$TI_2$, $TO_1$), Path(BCFE×$TI_2$, $TO_1$) may accordingly be a witness path 703 for Path(BE×$TI_2$, $TO_1$).

Figures 8, 9:
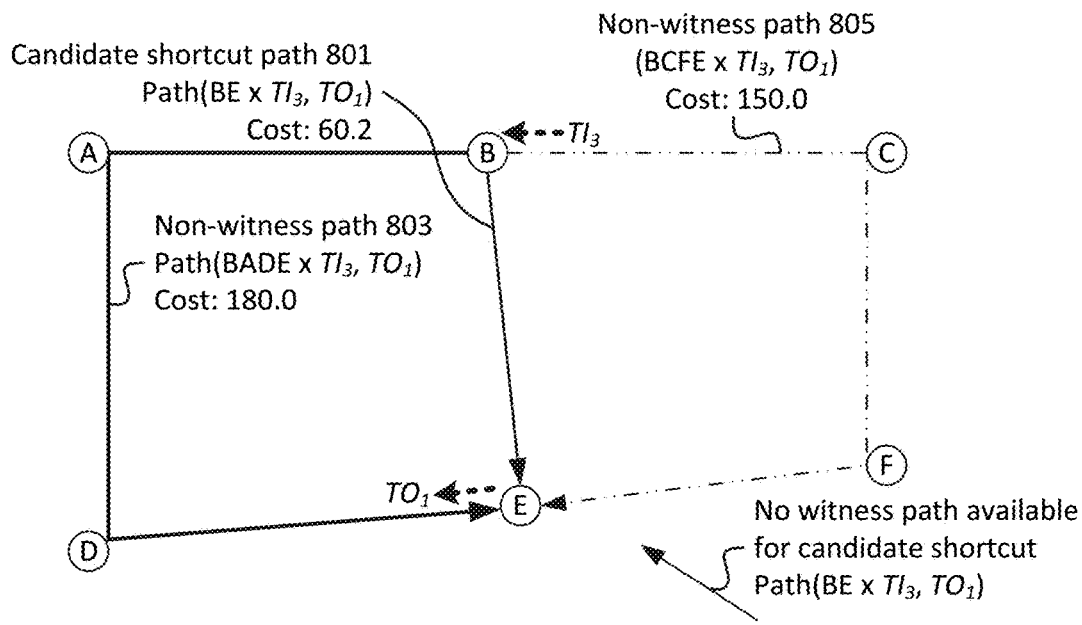
FIG. 9 illustrates an example reduction of candidate turn pairs for candidate shortcut link to a set of "useful" turn pairs for the candidate shortcut link.

FIG. 8 illustrates another example witness search that may be performed for the same candidate shortcut Path(BE), but with a different turn pair than discussed above with respect to FIGS. 6 and 7. For example, candidate shortcut path 801 may be Path(BE×$TI_3$, $TO_1$)—that is, having the component Path(BE) and component turns $TI_3$ and $TO_1$ (which may also be considered as the component "Turn Pair($TI_3$, $TO_1$)." In this example, paths 803 and 805 may be non-witness paths, as the respective path costs of paths 803 and 805 are each higher than the path cost of Path(BE×$TI_3$, $TO_1$). In other words, Path(BADE×$TI_3$, $TO_1$) has a higher path cost than Path(BE×$TI_3$, $TO_1$), and Path(BCFE×$TI_3$, $TO_1$) also has a higher path cost than Path(BE×$TI_3$, $TO_1$) in this example.

In situations where no witness paths are available for a particular candidate shortcut path with a particular turn pair, such as the example of FIG. 8, the particular candidate shortcut path with the particular turn pair may be determined as being "useful." Further, as referred to herein, the turn pair is "useful" for the shortcut path when no witness paths are found that include the turn pair for the shortcut path. For example, in FIG. 8, Turn Pair($TI_3$, $TO_1$) is a "useful" turn pair for shortcut Path(BE). Further, Path(BE×$TI_3$, $TO_1$) is considered a "useful" shortcut path.

For example, as shown in FIG. 9, data structure 900 illustrates all possible turn pairs for candidate shortcut Path(BE), and data structure 902 illustrates the useful turn pairs for candidate shortcut Path(BE). For example, as similarly discussed above, the useful turn pairs for shortcut Path(BE) may have been identified via one or more witness searches in a manner similarly described above with respect to FIGS. 7 and 8.

As discussed below, the useful turn pairs for a given shortcut path may allow for more efficient processing of subsequent iterations. For example, when evaluating further candidate shortcut paths that include previously analyzed candidate shortcuts (e.g., super shortcut paths that include one or more component shortcut paths), turns associated with non-useful turn pairs of the component shortcut paths may be omitted from the witness search process, thus saving processing time and resources. For example, if a particular turn or turn pair is not useful for a component shortcut path, it may be assumed that the same turn or turn pair is also not useful for a super shortcut path that includes the component shortcut path.

Figure 10:
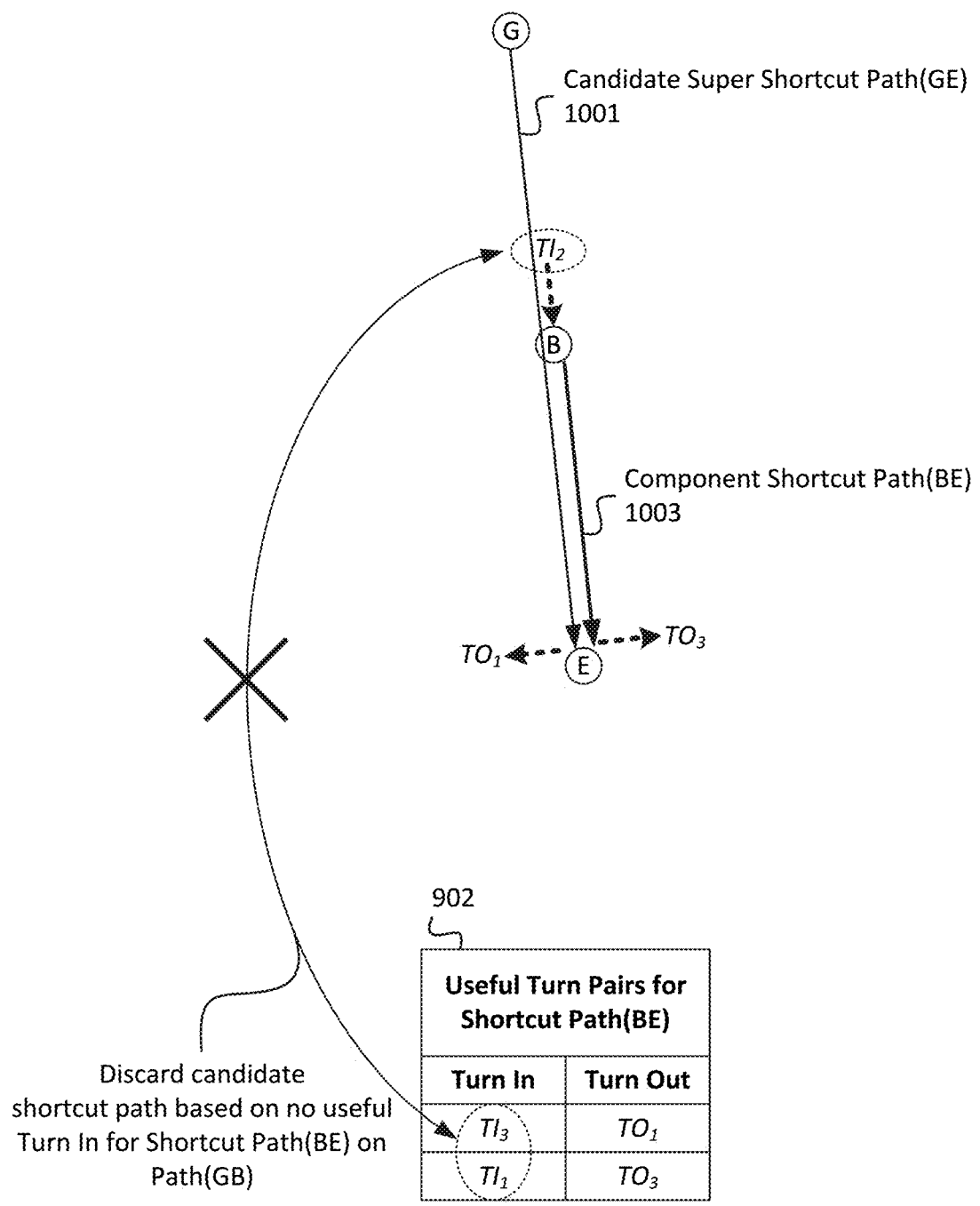
FIG. 10 illustrates an example determination that a particular candidate super shortcut path, which includes a previously identified component shortcut path, is not a valid shortcut path in accordance with some embodiments.

FIG. 10 illustrates one such iteration of determining whether a candidate super shortcut path should be included in a node map, based on useful turn pairs associated with a component shortcut path of the candidate super shortcut path. For example, as shown, candidate super shortcut path 1001—that is, Path(GE)—includes previously identified Path(BE) as a component shortcut path 1003. As shown, the path from Node G enters the component shortcut Path(BE) via $TI_2$. As reflected in data structure 902, the useful turn pairs for Path(BE) include only $TI_3$ and $TI_1$. That is, any turns in to Node B that do not include useful turns in $TI_3$ and $TI_1$ may be able to be determined as being not useful. As candidate super shortcut Path(GE) does not include a useful turn in to its component shortcut Path(BE), candidate super shortcut Path(GE) may be discarded (e.g., not included in a node map). In other words, as Path(GB)—that is, a path from the starting node of Path(GE) to the starting node of shortcut Path(BE)—does not include a useful turn in to Path(BE), candidate super shortcut Path(GE), which includes Path(GB), may not be a valid shortcut path.

More specifically, the useful turn pairs, including both the turns in and turns out, may be compared to candidate super shortcut path 1001 to determine whether candidate super shortcut path 1001 is a potentially valid shortcut path. For example, in this example, the useful turn pairs for Path(BE) include $TO_1$ and $TO_3$. While candidate super shortcut path 1001 includes $TO_1$ and $TO_3$, candidate super shortcut path 1001 may be discarded, excluded, etc. on the basis of not including any of the useful turns in for Path(BE). In other situations, a given candidate super shortcut may include one or more useful turns in for a component shortcut path, but may be discarded on the basis of not including any useful turns out for the component shortcut path. Similarly, a given candidate super shortcut may be discarded on the basis of not including any useful turns in or turns out for a component shortcut path.

Figure 11:
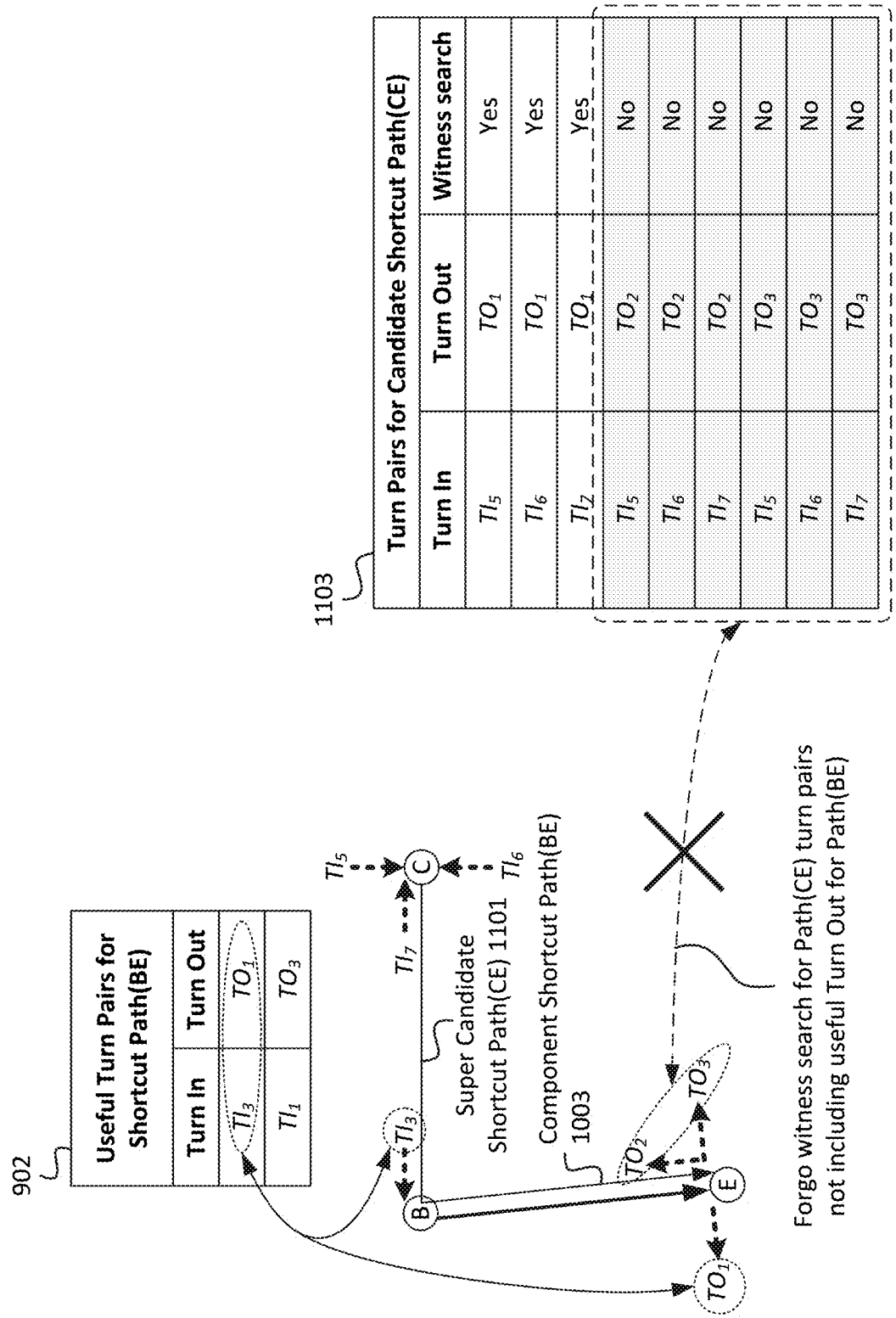
FIG. 11 illustrates an example determination that a particular candidate super shortcut path is a potentially valid shortcut path in accordance with some embodiments.

FIG. 11 illustrates example candidate super shortcut path 1101, which includes component shortcut path 1003. For example, candidate super shortcut path 1101 may include component shortcut Path(BE). As further shown, candidate super shortcut path 1101 may be associated with a set of example turns in (e.g., to Node C), which may include $TI_5$, $TI_6$, and $TI_7$. Further, as similarly discussed above, candidate super shortcut path 1101 may include a particular turn in associated with Path(BE). In this example, candidate super shortcut path 1101 includes $TI_3$ which, as discussed above and as reflected in data structure 902, is a useful turn in for component shortcut Path(BE).

Further, the turn outs associated with the applicable useful turns in for component Path(BE), from candidate super shortcut Path(CE), may be determined. For example, here, $TO_1$ is determined as being associated with $TI_3$. Further, the other turns out from Path(CE)—that is, $TO_2$ and $TO_3$—may be identified as not being useful for candidate super shortcut path 1101. For example, $TO_2$ is not included (e.g., in data structure 902) in the useful turn pairs associated with component shortcut Path(BE), and may accordingly be identified as not useful on this basis. On the other hand, while $TO_3$ is included in the useful turn pairs associated with component shortcut Path(BE), $TO_3$ may not be useful in this situation, as the turn in to component shortcut Path(BE) in this example (i.e., $TI_3$) does not match the turn in of any turn pair that includes $TO_3$. Thus, in this situation, and as reflected in data structure 1103, the only potentially useful turn pairs for candidate super shortcut path 1101 are those that include $TO_1$ as a turn out. In this example, the potentially useful turn pairs are ($TI_5$, $TO_1$), ($TI_6$, $TO_1$), and ($TI_7$, $TO_1$).

These turn pairs may be identified as "potentially" useful, as a witness search may still reveal that witness paths may exist for some or all of the potentially useful turn pairs. However, as denoted by the shading in data structure 1103, a witness search is not required for several of the turn pairs, as previous analyses (e.g., as discussed above) may have revealed that such turn pairs are not useful for component shortcut path 1003, and are therefore not useful for candidate super shortcut path 1101 which includes component shortcut path 1003. In other words, one or more previous witness searches may have been performed and one or more witness paths may have been previously identified for these turn pairs.

FIG. 12 illustrates example data structure 1200, which may reflect example results of witness searches performed on candidate super shortcut path 1101 for the identified potentially useful turn pairs ($TI_5$, $TO_1$), ($TI_6$, $TO_1$), and ($TI_7$, $TO_1$). In this example, a witness path may have been found for candidate super shortcut Path(CE×$TI_7$, $TO_1$). As such, Turn Pair($TI_7$, $TO_1$) may not be a useful turn pair with respect to shortcut Path(CE). In other words, shortcut Path (CE×$TI_7$, $TO_1$) may be determined not to be useful.

On the other hand, no witness path may have been found for shortcut Path(CE×$TI_5$, $TO_1$) or for shortcut Path(CE× $TI_6$, $TO_1$). As such, Turn Pair($TI_5$, $TO_1$) and Turn Pair($TI_6$, $TO_1$) may be considered useful for shortcut Path(CE). In other words, shortcut Path(CE×$TI_5$, $TO_1$) and shortcut Path (CE×$TI_6$, $TO_1$) may be determined to be useful.

Further, as denoted by the dashes in the "Witness found" column, other turn pairs for candidate super shortcut Path (CE) may be assumed to have witness paths, without performing a witness search for these turn pairs. For example, as similarly discussed above, a previous analysis of component shortcut Path(BE) may have revealed that witness paths exist for these turn pairs on Path(BE), and such witness paths may be assumed to apply for candidate super shortcut Path(CE) as well. As such, such turn pairs would not be included in any valid shortcut paths and turn pairs associated with candidate super shortcut Path(CE).

Accordingly, shortcut Link(CE)—that is, a shortcut link between Node C and Node E—may be added to the node map. Additionally, or alternatively, shortcut Path(CE)—that is, a path from Node C to Node E—may be added to the node map. As discussed above, in some embodiments, a similar analysis may be performed in the other direction (e.g., for candidate super shortcut Path(EC), based on component shortcut Path(EB)). Further, the useful turn pairs associated with shortcut Path(CE) may be maintained and used in a similar manner as described above (e.g., with respect to data structure 902). For example, in subsequent iterations, shortcut Path(CE) may be a component shortcut path of a super shortcut path. The analysis of such super shortcut path may be expedited in a manner similar to that as described with respect to FIGS. 11 and 12 for shortcut Path(CE), thus further saving processing resources and/or time.

Figure 13:
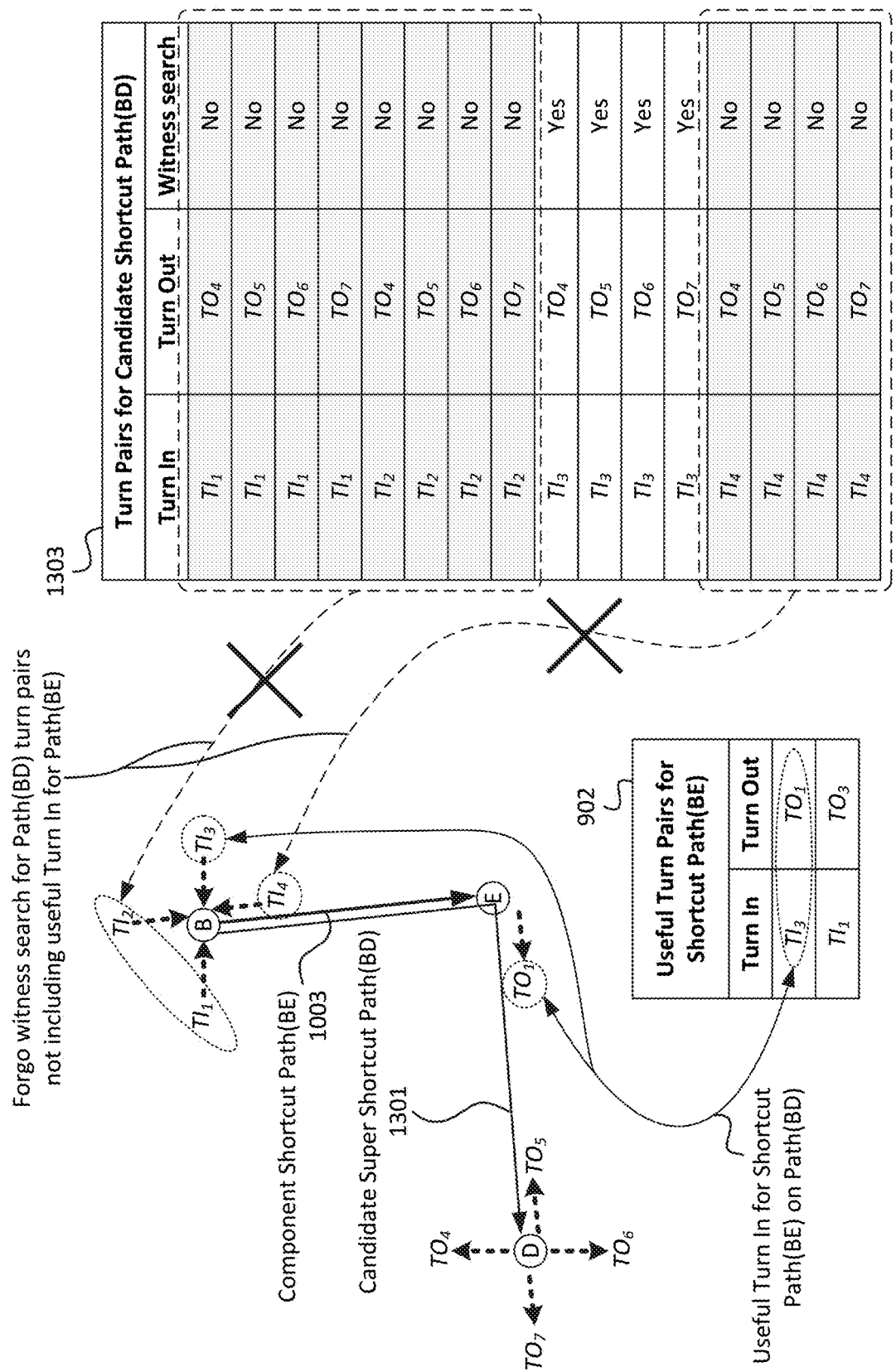
FIG. 13 illustrates an example determination that another candidate super shortcut path is a potentially valid shortcut path in accordance with some embodiments.

FIG. 13 illustrates another example candidate super shortcut path 1301, which also includes component shortcut path 1003 (i.e., shortcut Path(BE)). In the example of FIG. 11, the turns in to Node B were evaluated against the useful turn pairs of shortcut Path(BE), because the ending nodes of component shortcut Path(BE) and candidate super shortcut Path(CE) are the same node (i.e., Node E). In FIG. 13, the turns out from Node E are evaluated against the useful turn pairs of shortcut Path(BE), because the starting nodes of component shortcut Path(BE) and candidate super shortcut Path(BD) are the same node (i.e., Node B). For example, any valid super shortcut Path(BD) would need to include a valid turn out from component shortcut Path(BE). As one example, a left turn after entering Node E from Node B (e.g., $TO_3$, depicted in previous figures) would not reach Node D, and would therefore not be part of a valid super shortcut Path(BD).

For example, since at least one of the turns in to candidate super shortcut path 1301 is included in the useful turn pairs for component shortcut Path(BE)—that is, Turn Pair($TI_3$, $TO_1$)—candidate super shortcut path 1301 may be a candidate super shortcut to further evaluate for potential inclusion in a node map. For example, as similarly discussed above, data structure 1303 includes all of the possible turn pairs associated with candidate super shortcut Path(BD), and further indicates which of the turn pairs are potentially useful. For example, any turn pair that does not include $TI_3$ may be identified as not useful. For example, as noted above, $TO_1$ may be the only useful turn out from component shortcut Path(BE) with respect to candidate super shortcut (BD), and therefore the only valid turn in for candidate super shortcut(BD) is $TI_3$ (based on the useful turn pairs for component shortcut Path(BE) included in data structure 902).

Accordingly, as reflected in data structure 1303, all turn pairs associated with candidate super shortcut path 1301 that do not include $TI_3$ may be invalid, and no witness search need be performed for such turn pairs. For example, it may be assumed that such turn pairs have witness paths, based on prior analysis of candidate shortcut Path(BE), as discussed above. On the other hand, witness searches for Path(BD× $TO_3$, $TO_4$), Path(BD×$TO_3$, $TO_5$), Path(BD×$TO_3$, $TO_6$), and Path(BD×$TO_3$, $TO_7$) may reveal whether witness paths exist for Path(BD) with these four turn pairs.

As shown in FIG. 14, for example, data structure 1400 may reflect the results of witness searches performed for Path(BD×$TO_3$, $TO_4$), Path(BD×$TO_3$, $TO_5$), Path(BD×$TO_3$, $TO_6$), and Path(BD×$TO_3$, $TO_7$). In this example, a witness path may have been found for each one of the potentially valid turn pairs (e.g., Turn Pair($TO_3$, $TO_4$), Turn Pair($TO_3$, $TO_5$), Turn Pair($TO_3$, $TO_6$), and Turn Pair($TO_3$, $TO_7$)). As witness paths have been found for all turn pairs associated with candidate super shortcut Path(BD) in this example, candidate super shortcut Path(BD) may be useful in no situations (e.g., with respect to no turn pairs), and may therefore be omitted from the node map and/or otherwise recorded as a non-useful shortcut path.

Figure 15:
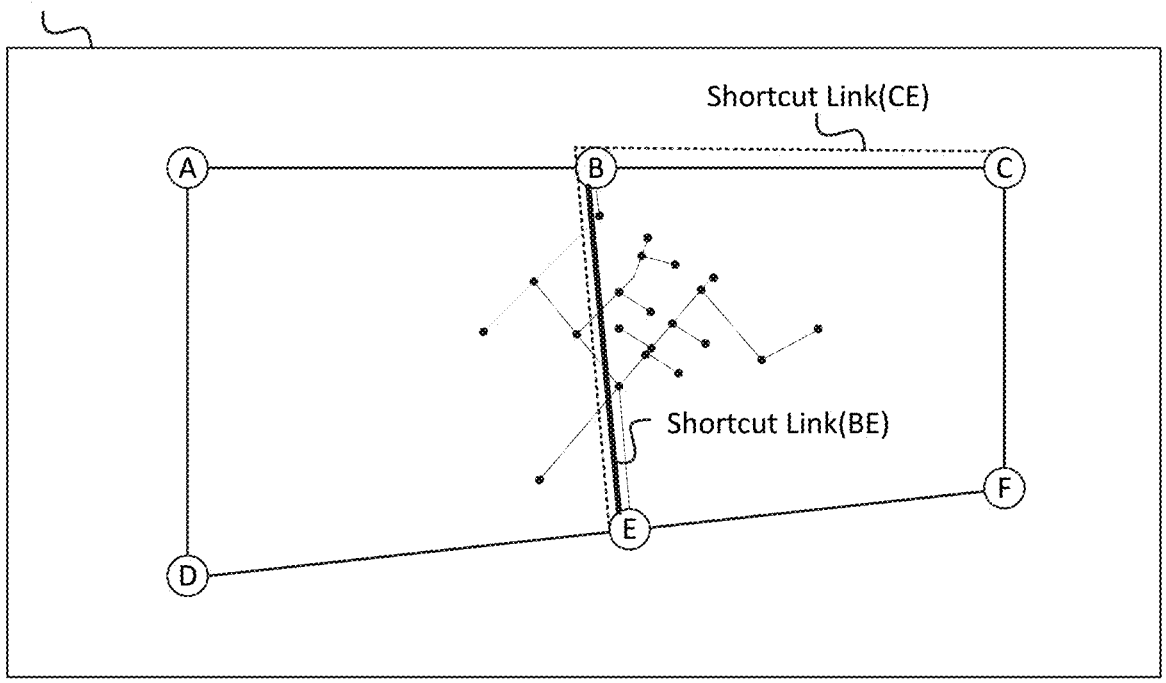
FIG. 15 illustrates an example node map that may be generated in accordance with some embodiments, including the super shortcut path of FIG. 11.

FIG. 15 illustrates an example node map 1501, which may be based on the example nodes and links identified with respect to map 101 (e.g., as discussed above with respect to FIG. 1). Node map 1501 may reflect, for example, the physical roads and intersections shown in map 101. Such physical roads and intersections may be associated with, for example, Nodes A-F. Additionally, while the nodes for intersections of minor roads 103 are not explicitly labeled in FIG. 15 for the sake of clarity, in practice, node map 1501 may include similar indications of such nodes. The small black circles in the portion of the figure corresponding to minor roads 103 may reflect, for example, the intersections and minor roads 103 shown in map 101.

Further, node map 1501 may include one or more links that were identified (e.g., as discussed above) as being useful. For example, shortcut Link(BE) may have been identified as including one or more useful paths (including one or more useful turn pairs) for which no witness paths exist. Further, shortcut Link(CE) may have been identified as including one or more useful paths. As discussed above, shortcut Link(CE) may have been identified in an expedited process in which a witness search was not needed for all turn pairs associated with shortcut Link(CE), based on Link(CE) being a super shortcut link that includes one or more useful component shortcut paths (e.g., Path(BE)) with one or more useful turn pairs.

In some embodiments, node map 1501 may include or represent information similar to that shown above with respect to data structures 900, 902, 1103, 1200, 1303, and/or 1400, which may aid in further shortcut link determination, as similarly discussed above. In some embodiments, such information may aid in executing a query based on node map 1501. For example, a query may include a starting node and an ending node, and embodiments herein may search for an optimal path through node map 1501 from the starting node to the ending node. The optimal path may, in some embodiments, be determined based on turn pairs and/or paths determined as useful, and the determination of the optimal path may further include omitting turn pairs and/or paths not determined as useful, thus saving processing resources and time.

Figure 16:
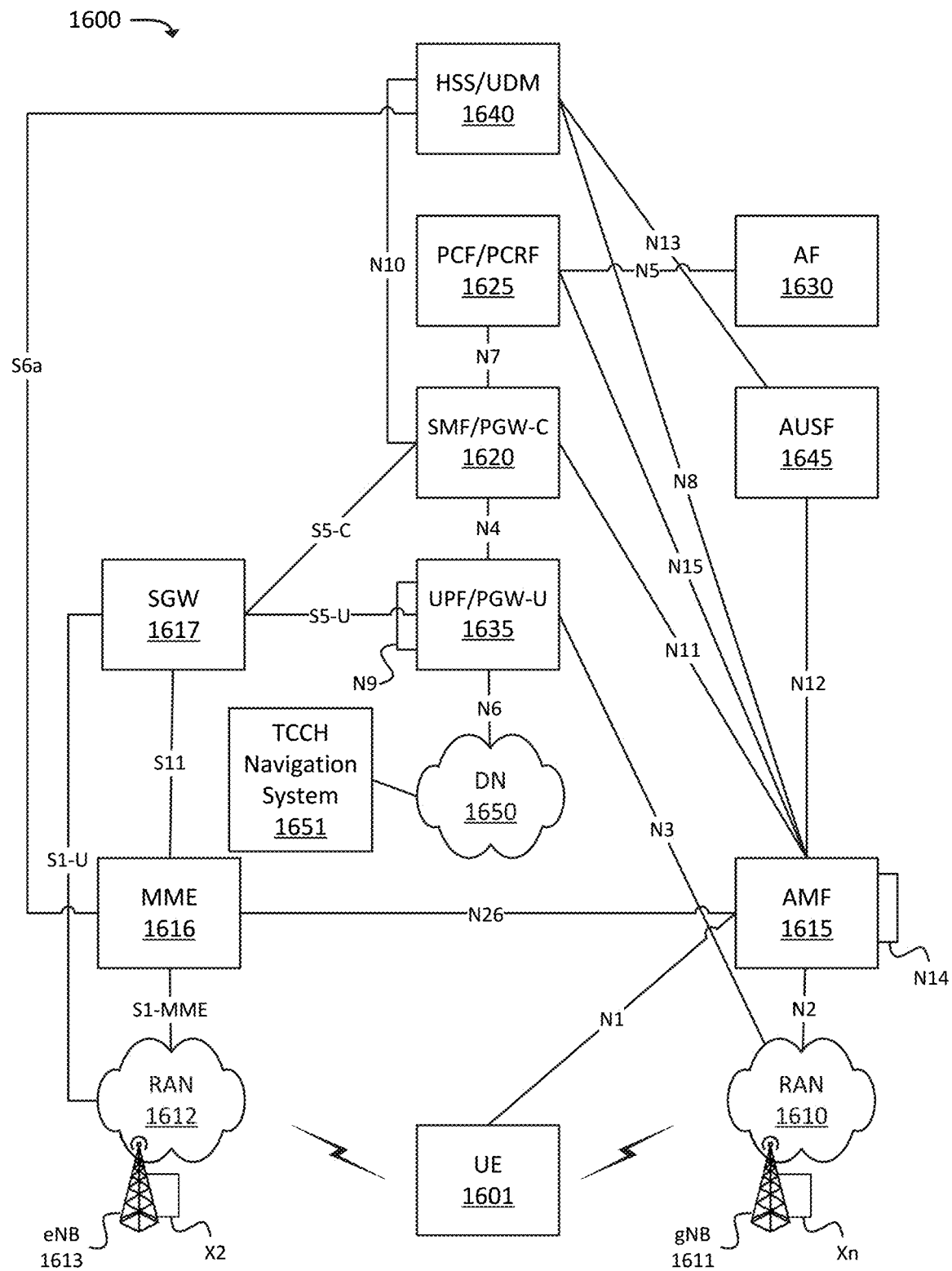
FIG. 16 illustrates an example environment in which one or more embodiments, described herein, may be implemented.

FIG. 16 illustrates an example environment 1600, in which one or more embodiments may be implemented. In some embodiments, environment 1600 may correspond to a Fifth Generation ("5G") network, and/or may include elements of a 5G network. In some embodiments, environment 1600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1600 may include UE 1601, RAN 1610 (which may include one or more Next Generation Node Bs ("gNBs") 1611), RAN 1612 (which may include one or more one or more evolved Node Bs ("eNBs") 1613), and various network functions such as Access and Mobility Management Function ("AMF") 1615, Mobility Management Entity ("MME") 1616, Serving Gateway ("SGW") 1617, Session Management Function ("SMF")/Packet Data Network ("PDN") Gateway ("PGW")-Control plane function ("PGW-C") 1620, Policy Control Function ("PCF")/Policy Charging and Rules Function ("PCRF") 1625, Application Function ("AF") 1630, User Plane Function ("UPF")/PGW-User plane function ("PGW-U") 1635, Home Subscriber Server ("HSS")/Unified Data Management ("UDM") 1640, and Authentication Server Function ("AUSF") 1645. Environment 1600 may also include one or more networks, such as Data Network ("DN") 1650. Environment 1100 may include one or more additional devices or systems communicatively coupled to one or more networks (e.g., DN 1650), such as Turn Cost Contraction Hierarchy ("TCCH") Navigation System 1651.

The example shown in FIG. 16 illustrates one instance of each network component or function (e.g., one instance of SMF/PGW-C 1620, PCF/PCRF 1625, UPF/PGW-U 1635, HSS/UDM 1640, and/or 1645). In practice, environment 1600 may include multiple instances of such components or functions. For example, in some embodiments, environment 1600 may include multiple "slices" of a core network, where each slice includes a discrete set of network functions (e.g., one slice may include a first instance of SMF/PGW-C 1620, PCF/PCRF 1625, UPF/PGW-U 1635, HSS/UDM 1640, and/or 1645, while another slice may include a second instance of SMF/PGW-C 1620, PCF/PCRF 1625, UPF/PGW-U 1635, HSS/UDM 1640, and/or 1645). The different slices may provide differentiated levels of service, such as service in accordance with different Quality of Service ("QoS") parameters.

The quantity of devices and/or networks, illustrated in FIG. 16, is provided for explanatory purposes only. In practice, environment 1600 may include additional devices and/or networks, fewer devices and/or networks, different devices and/or networks, or differently arranged devices and/or networks than illustrated in FIG. 16. For example, while not shown, environment 1600 may include devices that facilitate or enable communication between various components shown in environment 1600, such as routers, modems, gateways, switches, hubs, etc. Alternatively, or additionally, one or more of the devices of environment 1600 may perform one or more network functions described as being performed by another one or more of the devices of environment 1600. Devices of environment 1600 may interconnect with each other and/or other devices via wired connections, wireless connections, or a combination of wired and wireless connections. In some implementations, one or more devices of environment 1600 may be physically integrated in, and/or may be physically attached to, one or more other devices of environment 1600.

UE 1601 may include a computation and communication device, such as a wireless mobile communication device that is capable of communicating with RAN 1610, RAN 1612, and/or DN 1650. UE 1601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1601 may send traffic to and/or receive traffic (e.g., user plane traffic) from DN 1650 via RAN 1610, RAN 1612, and/or UPF/PGW-U 1635.

RAN 1610 may be, or may include, a 5G RAN that includes one or more base stations (e.g., one or more gNBs 1611), via which UE 1601 may communicate with one or more other elements of environment 1600. UE 1601 may communicate with RAN 1610 via an air interface (e.g., as provided by gNB 1611). For instance, RAN 1610 may receive traffic (e.g., voice call traffic, data traffic, messaging traffic, signaling traffic, etc.) from UE 1601 via the air interface, and may communicate the traffic to UPF/PGW-U 1635, and/or one or more other devices or networks. Similarly, RAN 1610 may receive traffic intended for UE 1601 (e.g., from UPF/PGW-U 1635, AMF 1615, and/or one or more other devices or networks) and may communicate the traffic to UE 1601 via the air interface.

RAN 1612 may be, or may include, a LTE RAN that includes one or more base stations (e.g., one or more eNBs 1613), via which UE 1601 may communicate with one or more other elements of environment 1600. UE 1601 may communicate with RAN 1612 via an air interface (e.g., as provided by eNB 1613). For instance, RAN 1610 may receive traffic (e.g., voice call traffic, data traffic, messaging traffic, signaling traffic, etc.) from UE 1601 via the air interface, and may communicate the traffic to UPF/PGW-U 1635, and/or one or more other devices or networks. Similarly, RAN 1610 may receive traffic intended for UE 1601 (e.g., from UPF/PGW-U 1635, SGW 1617, and/or one or more other devices or networks) and may communicate the traffic to UE 1601 via the air interface.

AMF 1615 may include one or more devices, systems, Virtualized Network Functions ("VNFs"), etc., that perform operations to register UE 1601 with the 5G network, to establish bearer channels associated with a session with UE 1601, to hand off UE 1601 from the 5G network to another network, to hand off UE 1601 from the other network to the 5G network, manage mobility of UE 1601 between RANs 1610 and/or gNBs 1611, and/or to perform other operations. In some embodiments, the 5G network may include multiple AMFs 1615, which communicate with each other via the N14 interface (denoted in FIG. 16 by the line marked "N14" originating and terminating at AMF 1615).

MME 1616 may include one or more devices, systems, VNFs, etc., that perform operations to register UE 1601 with the EPC, to establish bearer channels associated with a session with UE 1601, to hand off UE 1601 from the EPC to another network, to hand off UE 1601 from another network to the EPC, manage mobility of UE 1601 between RANs 1612 and/or eNBs 1613, and/or to perform other operations.

SGW 1617 may include one or more devices, systems, VNFs, etc., that aggregate traffic received from one or more eNBs 1613 and send the aggregated traffic to an external network or device via UPF/PGW-U 1635. Additionally, SGW 1617 may aggregate traffic received from one or more UPF/PGW-Us 1635 and may send the aggregated traffic to one or more eNBs 1613. SGW 1617 may operate as an anchor for the user plane during inter-eNB handovers and as an anchor for mobility between different telecommunication networks or RANs (e.g., RANs 1610 and 1612).

SMF/PGW-C 1620 may include one or more devices, systems, VNFs, etc., that gather, process, store, and/or provide information in a manner described herein. SMF/

PGW-C 1620 may, for example, facilitate in the establishment of communication sessions on behalf of UE 1601. In some embodiments, the establishment of communications sessions may be performed in accordance with one or more policies provided by PCF/PCRF 1625.

PCF/PCRF 1625 may include one or more devices, systems, VNFs, etc., that aggregate information to and from the 5G network and/or other sources. PCF/PCRF 1625 may receive information regarding policies and/or subscriptions from one or more sources, such as subscriber databases and/or from one or more users (such as, for example, an administrator associated with PCF/PCRF 1625).

AF 1630 may include one or more devices, systems, VNFs, etc., that receive, store, and/or provide information that may be used in determining parameters (e.g., quality of service parameters, charging parameters, or the like) for certain applications.

UPF/PGW-U 1635 may include one or more devices, systems, VNFs, etc., that receive, store, and/or provide data (e.g., user plane data). For example, UPF/PGW-U 1635 may receive user plane data (e.g., voice call traffic, data traffic, etc.), destined for UE 1601, from DN 1650, and may forward the user plane data toward UE 1601 (e.g., via RAN 1610, SMF/PGW-C 1620, and/or one or more other devices). In some embodiments, multiple UPFs 1635 may be deployed (e.g., in different geographical locations), and the delivery of content to UE 1601 may be coordinated via the N9 interface (e.g., as denoted in FIG. 16 by the line marked "N9" originating and terminating at UPF/PGW-U 1635). Similarly, UPF/PGW-U 1635 may receive traffic from UE 1601 (e.g., via RAN 1610, SMF/PGW-C 1620, and/or one or more other devices), and may forward the traffic toward DN 1650. In some embodiments, UPF/PGW-U 1635 may communicate (e.g., via the N4 interface) with SMF/PGW-C 1620, regarding user plane data processed by UPF/PGW-U 1635.

HSS/UDM 1640 and AUSF 1645 may include one or more devices, systems, VNFs, etc., that manage, update, and/or store, in one or more memory devices associated with AUSF 1645 and/or HSS/UDM 1640, profile information associated with a subscriber. AUSF 1645 and/or HSS/UDM 1640 may perform authentication, authorization, and/or accounting operations associated with the subscriber and/or a communication session with UE 1601.

DN 1650 may include one or more wired and/or wireless networks. For example, DN 1650 may include an Internet Protocol ("IP")-based PDN, a wide area network ("WAN") such as the Internet, a private enterprise network, and/or one or more other networks. UE 1601 may communicate, through DN 1650, with data servers, other UEs 1601, and/or to other servers or applications that are coupled to DN 1650. DN 1650 may be connected to one or more other networks, such as a public switched telephone network ("PSTN"), a public land mobile network ("PLMN"), and/or another network. DN 1650 may be connected to one or more devices, such as content providers, applications, web servers, and/or other devices, with which UE 1601 may communicate.

TCCH Navigation System 1651 may include one or more devices, systems, VNFs, etc. that perform one or more operations described herein. In some embodiments, some or all of the operations described herein (e.g., with respect to FIGS. 1-5, 18, and/or 19) may be performed by TCCH Navigation System 1651. For example, TCCH Navigation System 1651 may generate one or more node maps that include one or more shortcut links that were determined based on turn costs, as discussed above. For example, some shortcut links (e.g., super shortcut links) may be generated based on component shortcut links and useful turn pairs associated with the component shortcut links.

Figure 17:
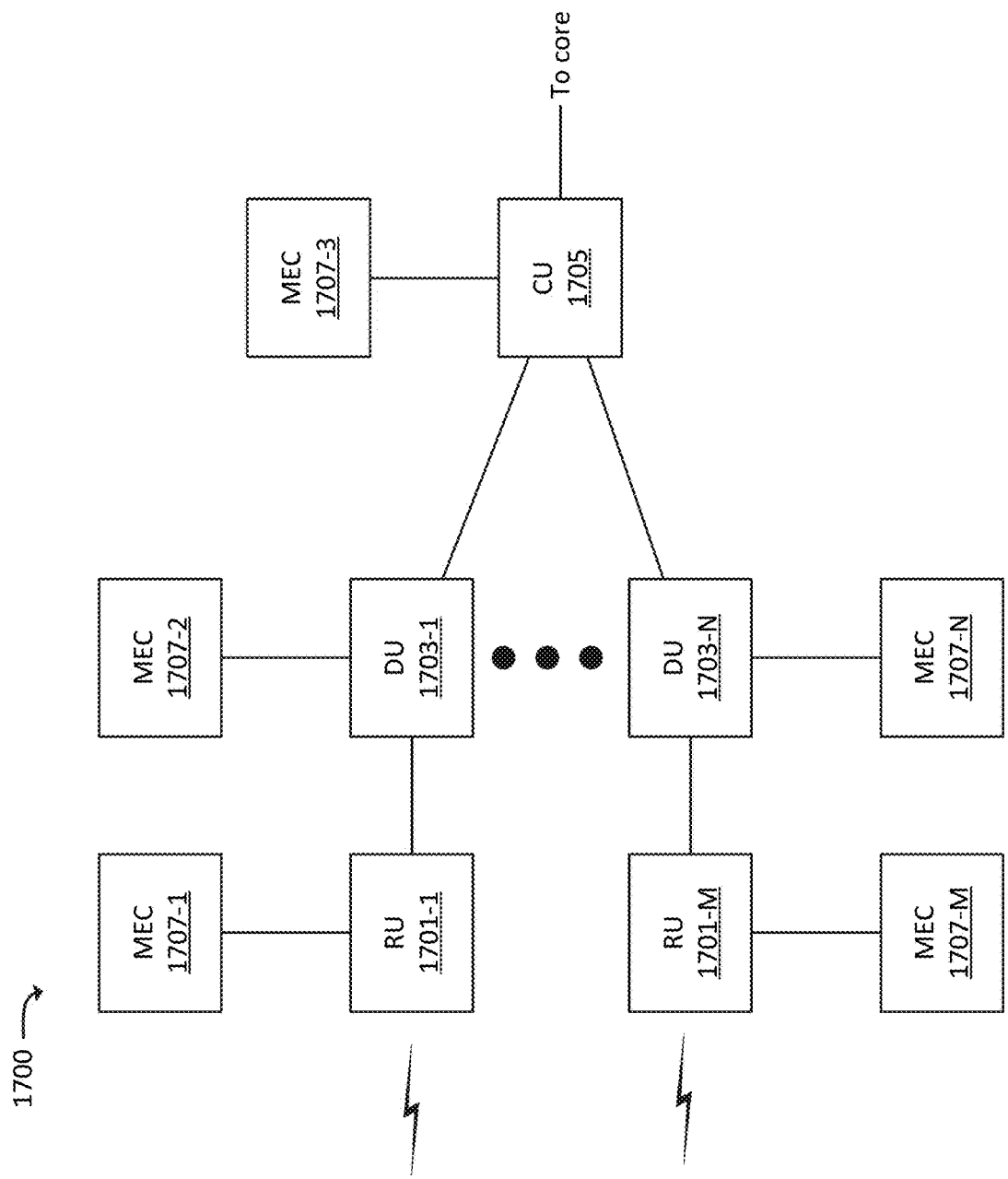
FIG. 17 illustrates an example arrangement of a radio access network ("RAN"), in accordance with some embodiments.

FIG. 17 illustrates an example Distributed Unit ("DU") network 1700, which may be included in and/or implemented by one or more RANs (e.g., RAN 1610, RAN 1612, or some other RAN). In some embodiments, a particular RAN may include one DU network 1700. In some embodiments, a particular RAN may include multiple DU networks 1700. In some embodiments, DU network 1700 may correspond to a particular gNB 1611 of a 5G RAN (e.g., RAN 1610). In some embodiments, DU network 1700 may correspond to multiple gNBs 1611. In some embodiments, DU network 1700 may correspond to one or more other types of base stations of one or more other types of RANs. As shown, DU network 1700 may include Central Unit ("CU") 1705, one or more Distributed Units ("DUs") 1703-1 through 1703-N (referred to individually as "DU 1703," or collectively as "DUs 1703"), and one or more Radio Units ("RUs") 1701-1 through 1701-M (referred to individually as "RU 1701," or collectively as "RUs 1701").

CU 1705 may communicate with a core of a wireless network (e.g., may communicate with one or more of the devices or systems described above with respect to FIG. 16, such as AMF 1615 and/or UPF/PGW-U 1635). In the uplink direction (e.g., for traffic from UEs 1601 to a core network), CU 1705 may aggregate traffic from DUs 1703, and forward the aggregated traffic to the core network. In some embodiments, CU 1705 may receive traffic according to a given protocol (e.g., Radio Link Control ("RLC")) from DUs 1703, and may perform higher-layer processing (e.g., may aggregate/process RLC packets and generate Packet Data Convergence Protocol ("PDCP") packets based on the RLC packets) on the traffic received from DUs 1703.

In accordance with some embodiments, CU 1705 may receive downlink traffic (e.g., traffic from the core network) for a particular UE 1601, and may determine which DU(s) 1703 should receive the downlink traffic. DU 1703 may include one or more devices that transmit traffic between a core network (e.g., via CU 1705) and UE 1601 (e.g., via a respective RU 1701). DU 1703 may, for example, receive traffic from RU 1701 at a first layer (e.g., physical ("PHY") layer traffic, or lower PHY layer traffic), and may process/aggregate the traffic to a second layer (e.g., upper PHY and/or RLC). DU 1703 may receive traffic from CU 1705 at the second layer, may process the traffic to the first layer, and provide the processed traffic to a respective RU 1701 for transmission to UE 1601.

RU 1701 may include hardware circuitry (e.g., one or more RF transceivers, antennas, radios, and/or other suitable hardware) to communicate wirelessly (e.g., via an RF interface) with one or more UEs 1601, one or more other DUs 1703 (e.g., via RUs 1701 associated with DUs 1703), and/or any other suitable type of device. In the uplink direction, RU 1701 may receive traffic from UE 1601 and/or another DU 1703 via the RF interface and may provide the traffic to DU 1703. In the downlink direction, RU 1701 may receive traffic from DU 1703, and may provide the traffic to UE 1601 and/or another DU 1703.

RUs 1701 may, in some embodiments, be communicatively coupled to one or more Multi-Access/Mobile Edge Computing ("MEC") devices, referred to sometimes herein simply as ("MECs") 1707. For example, RU 1701-1 may be communicatively coupled to MEC 1707-1, RU 1701-M may be communicatively coupled to MEC 1707-M, DU 1703-1 may be communicatively coupled to MEC 1707-2, DU 1703-N may be communicatively coupled to MEC 1707-N, CU 1705 may be communicatively coupled to MEC 1707-3, and so on. MECs 1707 may include hardware resources (e.g., configurable or provisionable hardware resources) that may be configured to provide services and/or otherwise process traffic to and/or from UE 1601, via a respective RU 1701.

For example, RU 1701-1 may route some traffic, from UE 1601, to MEC 1707-1 instead of to a core network (e.g., via DU 1703 and CU 1705). MEC 1707-1 may process the traffic, perform one or more computations based on the received traffic, and may provide traffic to UE 1601 via RU 1701-1. In this manner, ultra-low latency services may be provided to UE 1601, as traffic does not need to traverse DU 1703, CU 1705, and an intervening backhaul network between DU network 1700 and the core network. In some embodiments, MEC 1707 may include, and/or may implement some or all of the functionality described above with respect to TCCH Navigation System 1651.

Figure 18:
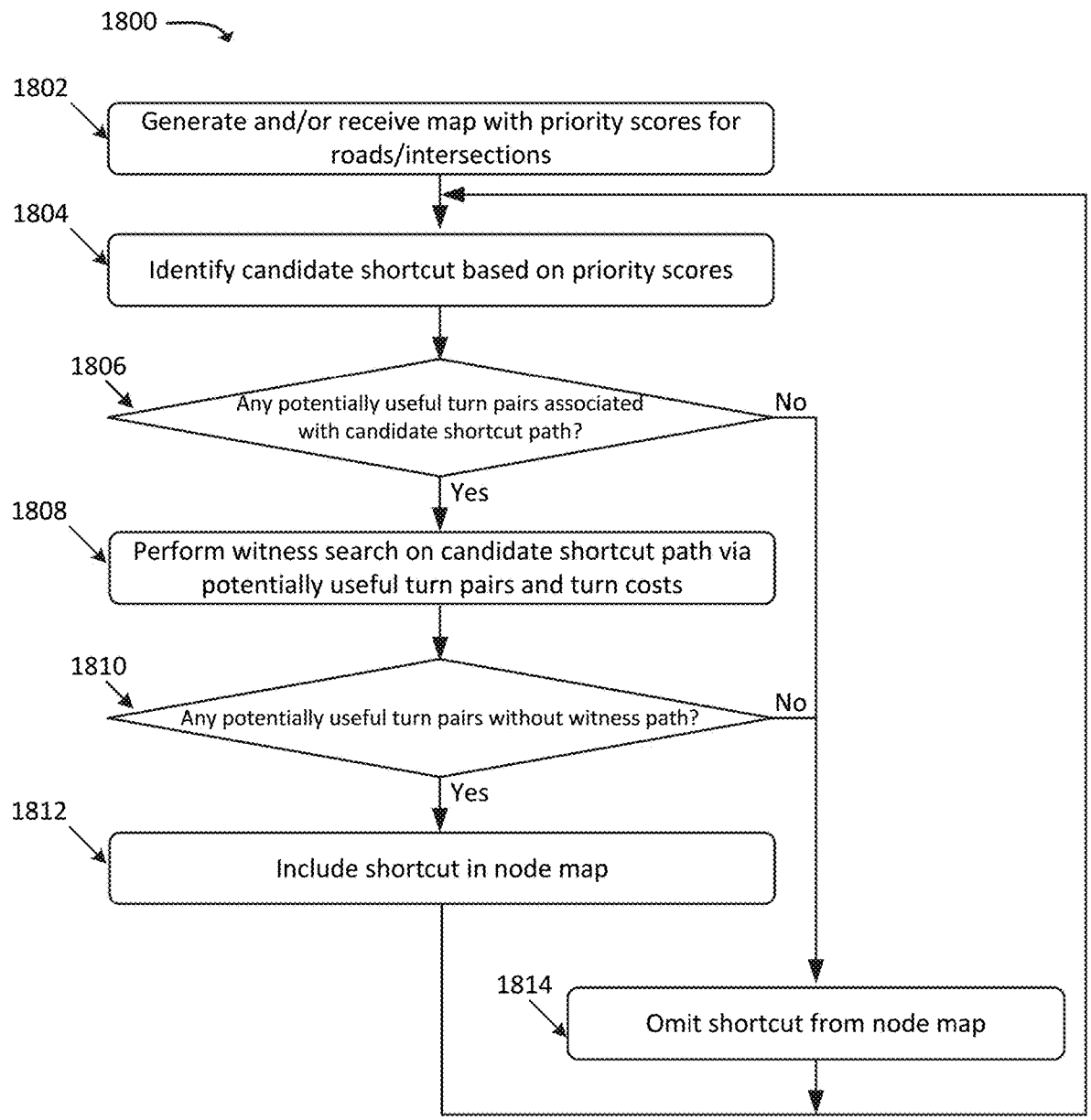
FIG. 18 illustrates an example process for generating a node map, including one or more shortcut links, based on turn costs associated with turn pairs associated with the shortcut links.

FIG. 18 illustrates an example process 1800 for generating a node map, including one or more shortcut links, based on turn costs associated with turn pairs associated with the shortcut links. In some embodiments, some or all of process 1800 may be performed by TCCH Navigation System 1651. In some embodiments, one or more other devices may perform some or all of process 1800 in concert with, and/or in lieu of, TCCH Navigation System 1651.

As shown, process 1800 may include generating and/or receiving (at 1802) a map with priority scores for roads and/or intersections depicted in the map. For example, TCCH Navigation System 1651 may receive a map (e.g., as similarly discussed above with respect to map 101). The map may be associated with roads and intersections, or other types of pathways. For example, in some embodiments, the map may be associated with pipelines, circuits, railway tracks, and/or other types of pathways that may be traversed. In some embodiments, TCCH Navigation System 1651 may determine and/or may receive importance scores for some or all of the roads and/or intersections. As noted above, importance scores may be associated with one or more factors of the roads and/or intersections. For example, a road with a relatively "low" importance may be a relatively small road, may have a relatively small traffic volume, may be a residential road, and/or may have other suitable attributes. As another example, a road with a relatively "high" importance may be a relatively large road (e.g., a large quantity of lanes, a relatively long length, etc.), may have a relatively large traffic volume, may be a highway, and/or may have other suitable attributes.

Process 1800 may further include identifying (at 1804) a candidate shortcut link based on the importance scores. In some embodiments, TCCH Navigation System 1651 may identify a candidate shortcut link based on one or more factors in addition to, or in lieu of, importance scores. For the sake of brevity, importance scores are discussed herein as the factor based on which candidate shortcut links are identified. For example, TCCH Navigation System 1651 may identify one or more links (e.g., a single link or a series of links) with relatively low importance scores. For example, TCCH Navigation System 1651 may identify one or more links with importance scores below a threshold, and/or may identify one or more links that have a lowest importance score (or set of importance scores) and that have not yet been analyzed. For example, as discussed below, some or all of process 1800 may be performed iteratively, and TCCH Navigation System 1651 may perform iterations in a sequence that is based on ascending importance scores of links or sets of links.

Process 1800 may additionally include determining (at 1806) whether any potentially useful turn pairs are associated with the candidate shortcut path. For example, as discussed above, a potentially useful turn pair may be a turn pair that has not been previously eliminated based on previous iterations of process 1800 or by some other type of elimination criteria.

For example, as illustrated in FIG. 10, TCCH Navigation System 1651 may identify whether the candidate shortcut link includes any component shortcut links, and may further identify whether one or more paths through the candidate shortcut link and the component shortcut link includes one or more valid turns associated with the component shortcut link. For example, if a given candidate super shortcut link path (e.g., a particular path through the candidate shortcut link and the component shortcut link) travels into the component shortcut link, TCCH Navigation System 1651 may determine whether the candidate super shortcut link path includes any useful turns in to the component shortcut link. As another example, if the candidate super shortcut link path travels out of the component shortcut link, TCCH Navigation System 1651 may determine whether the candidate super shortcut link path includes any useful turns out of the component shortcut link.

As another example, as illustrated in FIG. 11, TCCH Navigation System 1651 may identify that the candidate shortcut link includes one or more candidate super shortcut paths, such as super shortcut Path(CE), which includes component shortcut Path(BE). As discussed above, since the path from Node C into Path(BE) includes a useful turn in for Path(BE)—that is, $TI_3$—and further because one or more of the turns out from super shortcut Path(CE) include a turn out (i.e., $TO_1$ in this example) that is associated with the same turn pair as the useful turn in for Path(BE), TCCH Navigation System 1651 may determine that at least one turn pair (e.g., turn pairs that include the turn out included in the same useful turn pair for Path(BE)) associated with the candidate super shortcut path is potentially valid.

In some embodiments, in situations where the candidate shortcut link (identified at 1804) does not include any component shortcut links, all possible turn pairs associated with the candidate shortcut link may be presumed to be potentially useful. For example, as reflected in data structure 900, all 12 turn pairs for example candidate shortcut Path (BE), which does not include any component shortcut paths, may be determined to be potentially valid, and may subsequently be subject to one or more witness searches (as discussed below).

If any potentially useful turn pairs have been identified with respect to the candidate shortcut path (at 1806—YES), then process 1800 may also include performing (at 1808) witness searches on the candidate shortcut path, via the identified potentially useful turn pairs. For example, as similarly discussed above (e.g., with respect to FIGS. 7-9, 12, and/or 14), TCCH Navigation System 1651 may perform witness searches for the potentially useful turn pairs to identify whether any witness paths exist for such turn pairs along the candidate shortcut path. As discussed above, witness paths may be valid if the costs associated with the witness paths, including turn costs, are lower than the costs associated with the candidate shortcut path, Process 1800 may further include determining (at 1810) whether any potentially useful turn pairs do not have a witness path. If none of the potentially useful turn pairs associated with the candidate shortcut link (e.g., one or more paths through the candidate shortcut link) have a witness path, then process 1800 may additionally comprise including (at 1812) the candidate shortcut link in a node map, which may be used to evaluate queries, such as navigation queries. TCCH Navigation System 1651 may also generate or maintain information (e.g., as similarly described above with respect to data structure 1200) indicating which particular turn pairs are useful for the shortcut path. Thus, in subsequent iterations (e.g., at 1806), such information may be used to determine whether a super shortcut path, that includes the shortcut link (or a path through the shortcut link), is associated with any potentially useful turn pairs.

If the candidate shortcut path is not associated with any potentially useful turn pairs (at 1806—NO) and/or if all of the potentially useful turn pairs are associated with a witness path (at 1810—NO), then process 1800 may also include omitting (at 1814) the candidate shortcut from the node map. For example, such omission may reflect that the candidate shortcut would never (or virtually never) be chosen in favor of other, less costly paths when evaluating the node map against a query.

Figure 19:
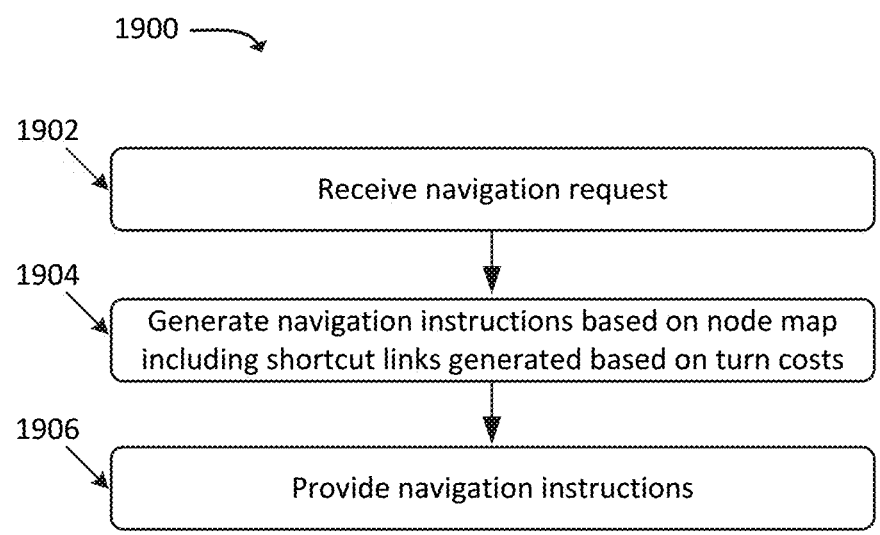
FIG. 19 illustrates an example process for using a node map, including one or more shortcut links determined based on turn costs in accordance with some embodiments, to generate navigation instructions in response to a navigation request.

FIG. 19 illustrates an example process 1900 for using a node map, including one or more shortcut links and/or super shortcut links generated based on turn costs as described above, to generate navigation instructions in response to a navigation request. In some embodiments, some or all of process 1900 may be performed by TCCH Navigation System 1651. In some embodiments, one or more other devices may perform some or all of process 1900 in concert with, and/or in lieu of, TCCH Navigation System 1651.

As shown, process 1900 may include receiving (at 1902) a navigation request, including vehicle parameters. For example, TCCH Navigation System 1651 may receive a request to navigate from a particular node, in a node map (e.g., as generated according to process 1800 or some other suitable process), to another node in the node map.

Process 1900 may further include generating (at 1904) navigation instructions based on the node map. For example, TCCH Navigation System 1651 may use a bidirectional search to identify one or more paths from the starting node to the ending node. For example, TCCH Navigation System 1651 may perform one or more searches originating from the starting node and/or the ending node. In some embodiments, the bidirectional search may include identifying nodes or paths that have a higher importance score than a present node, and iteratively continuing to search for nodes or paths with higher importance score than the present node. In this manner, one or more paths originating from the starting node may intersect with one or more paths originating from the ending node, and TCCH Navigation System 1651 may select a particular complete path (e.g., an intersection of a path originating from the starting node and a path originating from the ending node) based on cumulative cost, including turn costs, and/or one or more other factors.

Process 1900 may additionally include providing (at 1906) the navigation instructions. For example, TCCH Navigation System 1651 may provide an indication of the path (determined at 1904) to a requesting device, such as UE 1601. UE 1601 may, in turn, present the navigation instructions via a display screen, audibly present the navigation instructions, or perform one or more other suitable operations to present the navigation instructions.

Figure 20:
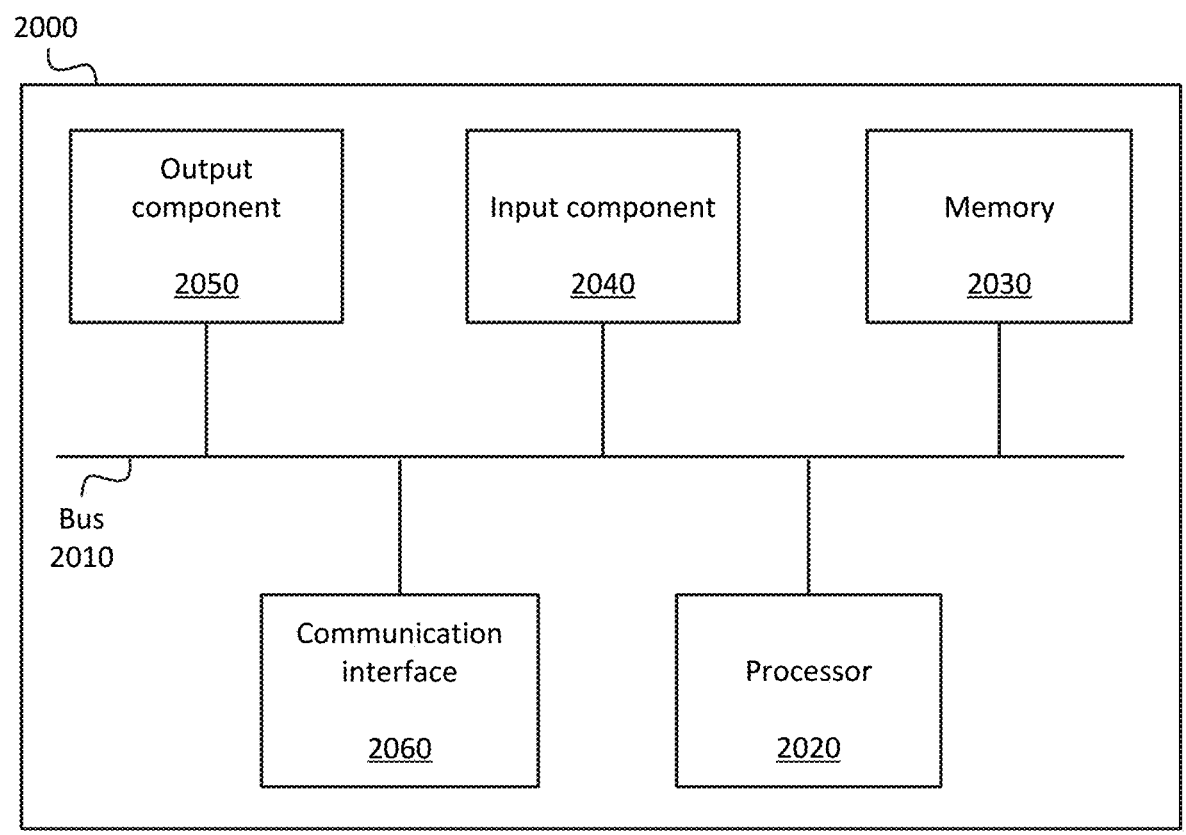
FIG. 20 illustrates example components of one or more devices, in accordance with one or more embodiments described herein.

FIG. 20 illustrates example components of device 2000. One or more of the devices described above may include one or more devices 2000. Device 2000 may include bus 2010, processor 2020, memory 2030, input component 2040, output component 2050, and communication interface 2060. In another implementation, device 2000 may include additional, fewer, different, or differently arranged components.

Bus 2010 may include one or more communication paths that permit communication among the components of device 2000. Processor 2020 may include a processor, microprocessor, or processing logic that may interpret and execute instructions. Memory 2030 may include any type of dynamic storage device that may store information and instructions for execution by processor 2020, and/or any type of non-volatile storage device that may store information for use by processor 2020.

Input component 2040 may include a mechanism that permits an operator to input information to device 2000 and/or other receives or detects input from a source external to 2040, such as a touchpad, a touchscreen, a keyboard, a keypad, a button, a switch, a microphone or other audio input component, etc. In some embodiments, input component 2040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 2050 may include a mechanism that outputs information to the operator, such as a display, a speaker, one or more light emitting diodes ("LEDs"), etc.

Communication interface 2060 may include any transceiver-like mechanism that enables device 2000 to communicate with other devices and/or systems. For example, communication interface 2060 may include an Ethernet interface, an optical interface, a coaxial interface, or the like. Communication interface 2060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 2000 may include more than one communication interface 2060. For instance, device 2000 may include an optical interface and an Ethernet interface.

Device 2000 may perform certain operations relating to one or more processes described above. Device 2000 may perform these operations in response to processor 2020 executing software instructions stored in a computer-readable medium, such as memory 2030. A computer-readable medium may be defined as a non-transitory memory device. A memory device may include space within a single physical memory device or spread across multiple physical memory devices. The software instructions may be read into memory 2030 from another computer-readable medium or from another device. The software instructions stored in memory 2030 may cause processor 2020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-15, 18, and 19), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive information indicating a first link between a first node and a second node, wherein the first link is associated with:
   a first set of turns into the first node,
   a second set of turns out of the second node, and
   a first plurality of turn pairs that each include one turn of the first set of turns and one turn of the second set of turns;
   identify at least one of:
   a first set of turn pairs, of the first plurality of turn pairs associated with the first link, that are valid with respect to the first link, or
   a second set of turn pairs, of the first plurality of associated with the first link, that are invalid with respect to the first link;
   generate a second link between the first node and a third node, wherein the second link further includes the first link, wherein the second link is associated with a second plurality of turn pairs;
   identify, based on the first set of turn pairs or the second set of turn pairs, at least one of:
   a third set of turn pairs, of the second plurality of turn pairs, that are potentially valid with respect to the second link, or
   a fourth set of turn pairs, of the second plurality of turn pairs, that are invalid with respect to the second link;
   search for alternative paths between the first node and the third node, the search including searching based on the third set of potentially valid turn pairs without searching based on the fourth set of turn pairs;
   generate a node map that includes at least the first node, the second node, and the third node, wherein generating the node map includes:
   omitting the second link from the node map when the search based on the third set of turn pairs indicates that at least one alternative path exists between the first node and the second node; and
   including the second link in the node map when the search based on the third set of turn pairs indicates that no alternative paths exist between the first node and the second node;
   receive a request for navigation instructions from a starting point to a destination;
   identify a path, via the generated node map, from the starting point to the destination, wherein the path includes at least one of the first node, the second node, or the third node; and
   provide, in response to the request for navigation instructions, a set of navigation instructions associated with the identified path via the generated node map.

2. The device of claim 1, wherein searching for alternative paths includes at least one of:
   searching for alternative paths that do not include the first link, or
   searching for alternative paths that do not include the second link.

3. The device of claim 1, wherein the third set of turn pairs includes a particular turn pair, wherein searching for alternative paths includes searching for alternative paths that match the particular turn pair.

4. The device of claim 3, wherein the particular turn pair is associated with a first cost with respect to the second link, wherein the particular turn pair is associated with a second cost with respect to a particular candidate alternative path, wherein searching for the alternative paths includes:
determining whether the first cost is higher than the second cost, and
determining that at least one alternative path exists when the first cost is higher than the second cost.

5. The device of claim 1, wherein the first link between the first node and the second node represents at least two links and a fourth node.

6. The device of claim 1, wherein identifying the first set of turn pairs, of the first plurality of turn pairs associated with the first link, that are valid with respect to the first link, includes:
identifying that the first link, with the first set of turn pairs, is associated with a particular path that includes a particular turn pair of the first set of turn pairs, and is a path from the first node to the second node; and
identifying that the particular path has a lowest path cost of all possible paths, that include the particular turn pair, from the first node to the second node.

7. The device of claim 1, wherein identifying that the third set of turn pairs are potentially valid with respect to the second link includes at least one of:
determining that a particular turn, of the third set of turn pairs, is a same turn as a particular turn of the third set of turn pairs, or
determining that the particular turn, of the third set of turn pairs, is not included in the fourth set of turn pairs.

8. A non-transitory computer-readable medium, storing a plurality of processor-executable instructions to:
receive information indicating a first link between a first node and a second node, wherein the first link is associated with:
a first set of turns into the first node,
a second set of turns out of the second node, and
a first plurality of turn pairs that each include one turn of the first set of turns and one turn of the second set of turns;
identify at least one of:
a first set of turn pairs, of the first plurality of turn pairs associated with the first link, that are valid with respect to the first link, or
a second set of turn pairs, of the first plurality of turn pairs associated with the first link, that are invalid with respect to the first link;
generate a second link between the first node and a third node, wherein the second link further includes the first link, wherein the second link is associated with a second plurality of turn pairs;
identify, based on the first set of turn pairs or the second set of turn pairs, at least one of:
a third set of turn pairs, of the second plurality of turn pairs, that are potentially valid with respect to the second link, or
a fourth set of turn pairs, of the second plurality of turn pairs, that are invalid with respect to the second link;
a search for alternative paths between the first node and the third node, the search including searching based on the third set of potentially valid turn pairs without searching based on the fourth set of turn pairs;
generate a node map that includes at least the first node, the second node, and the third node, wherein generating the node map includes:
omitting the second link from the node map when the search based on the third set of turn pairs indicates that at least one alternative path exists between the first node and the second node; and
including the second link in the node map when the search based on the third set of turn pairs indicates that no alternative paths exist between the first node and the second node;
receive a request for navigation instructions from a starting point to a destination;
identify a path, via the generated node map, from the starting point to the destination, wherein the path includes at least one of the first node, the second node, or the third node; and
provide, in response to the request for navigation instructions, a set of navigation instructions associated with the identified path via the generated node map.

9. The non-transitory computer-readable medium of claim 8, wherein searching for alternative paths includes at least one of:
searching for alternative paths that do not include the first link, or
searching for alternative paths that do not include the second link.

10. The non-transitory computer-readable medium of claim 8, wherein the third set of turn pairs includes a particular turn pair, wherein searching for alternative paths includes searching for alternative paths that match the particular turn pair.

11. The non-transitory computer-readable medium of claim 10, wherein the particular turn pair is associated with a first cost with respect to the second link, wherein the particular turn pair is associated with a second cost with respect to a particular candidate alternative path,
wherein searching for the alternative paths includes:
determining whether the first cost is higher than the second cost, and
determining that at least one alternative path exists when the first cost is higher than the second cost.

12. The non-transitory computer-readable medium of claim 8, wherein the first link between the first node and the second node represents at least two links and a fourth node.

13. The non-transitory computer-readable medium of claim 8, wherein identifying the first set of turn pairs, of the first plurality of turn pairs associated with the first link, that are valid with respect to the first link, includes:
identifying that the first link, with the first set of turn pairs, is associated with a particular path that includes a particular turn pair of the first set of turn pairs, and is a path from the first node to the second node; and
identifying that the particular path has a lowest path cost of all possible paths, that include the particular turn pair, from the first node to the second node.

14. The non-transitory computer-readable medium of claim 8, wherein identifying that the third set of turn pairs are potentially valid with respect to the second link includes at least one of:
determining that a particular turn, of the third set of turn pairs, is a same turn as a particular turn of the third set of turn pairs, or
determining that the particular turn, of the third set of turn pairs, is not included in the fourth set of turn pairs.

15. A method, comprising:
receiving information indicating a first link between a first node and a second node, wherein the first link is associated with:
- a first set of turns into the first node,
- a second set of turns out of the second node, and
- a first plurality of turn pairs that each include one turn of the first set of turns and one turn of the second set of turns;

identifying at least one of:
- a first set of turn pairs, of the first plurality of turn pairs associated with the first link, that are valid with respect to the first link, or
- a second set of turn pairs, of the first plurality of associated with the first link, that are invalid with respect to the first link;

generating a second link between the first node and a third node, wherein the second link further includes the first link, wherein the second link is associated with a second plurality of turn pairs;

identifying, based on the first set of turn pairs or the second set of turn pairs, at least one of:
- a third set of turn pairs, of the second plurality of turn pairs, that are potentially valid with respect to the second link, or
- a fourth set of turn pairs, of the second plurality of turn pairs, that are invalid with respect to the second link;

searching for alternative paths between the first node and the third node, the search including searching based on the potentially valid third set of turn pairs without searching based on the fourth set of turn pairs;

generating a node map that includes at least the first node, the second node, and the third node, wherein generating the node map includes:
- omitting the second link from the node map when the search based on the third set of turn pairs indicates that at least one alternative path exists between the first node and the second node; and
- including the second link in the node map when the search based on the third set of turn pairs indicates that no alternative paths exist between the first node and the second node;

receiving a request for navigation instructions from a starting point to a destination;

identifying a path, via the generated node map, from the starting point to the destination, wherein the path includes at least one of the first node, the second node, or the third node; and providing, in response to the request for navigation instructions, a set of navigation instructions associated with the identified path via the generated node map.

16. The method of claim 15, wherein searching for alternative paths includes at least one of:
- searching for alternative paths that do not include the first link, or
- searching for alternative paths that do not include the second link.

17. The method of claim 15, wherein the third set of turn pairs includes a particular turn pair that is associated with a first cost with respect to the second link and is associated with a second cost with respect to a particular candidate alternative path, wherein searching for alternative paths includes:
- identifying the particular candidate alternative path that is associated with the particular turn pair;
- determining whether the first cost is higher than the second cost; and
- determining that at least one alternative path exists when the first cost is higher than the second cost.

18. The method of claim 15, wherein the first link between the first node and the second node represents at least two links and a fourth node.

19. The method of claim 15, wherein identifying the first set of turn pairs, of the first plurality of turn pairs associated with the first link, that are valid with respect to the first link, includes:
- identifying that the first link, with the first set of turn pairs, is associated with a particular path that includes a particular turn pair of the first set of turn pairs, and is a path from the first node to the second node; and
- identifying that the particular path has a lowest path cost of all possible paths, that include the particular turn pair, from the first node to the second node.

20. The method of claim 15, wherein identifying that the third set of turn pairs are potentially valid with respect to the second link includes at least one of:
- determining that a particular turn, of the third set of turn pairs, is a same turn as a particular turn of the third set of turn pairs, or
- determining that the particular turn, of the third set of turn pairs, is not included in the fourth set of turn pairs.

* * * * *